(12) United States Patent
Zuberi

(10) Patent No.: US 7,582,270 B2
(45) Date of Patent: *Sep. 1, 2009

(54) MULTI-FUNCTIONAL SUBSTANTIALLY FIBROUS MULLITE FILTRATION SUBSTRATES AND DEVICES

(75) Inventor: Bilal Zuberi, Cambridge, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/322,544

(22) Filed: Dec. 30, 2005

(65) Prior Publication Data

US 2006/0120937 A1 Jun. 8, 2006

Related U.S. Application Data

(63) Continuation-in-part of application No. 10/833,298, filed on Apr. 28, 2004, now Pat. No. 7,550,117, which is a continuation-in-part of application No. 10/281,179, filed on Oct. 28, 2002, now Pat. No. 6,946,013.

(51) Int. Cl.
*B01D 53/46* (2006.01)
*B21D 51/16* (2006.01)

(52) U.S. Cl. ......................... 423/210; 29/890
(58) Field of Classification Search ............... 423/210; 29/890; 55/486; 428/285
See application file for complete search history.

(56) References Cited

U.S. PATENT DOCUMENTS

| | | |
|---|---|---|
| 1,924,472 A | 8/1933 | Miller |
| 2,120,133 A | 6/1938 | Kohler |
| 2,390,262 A | 12/1945 | Mazer |
| 2,847,314 A | 8/1958 | Fisher |
| 2,830,407 A | 3/1960 | Conley |
| 3,077,413 A | 2/1963 | Campbell |
| 3,090,094 A | 5/1963 | Schwartzwalder |
| 3,094,394 A | 6/1963 | Innes |
| 3,112,184 A | 11/1963 | Hollenbach |
| 3,141,206 A | 7/1964 | Stephens |
| 3,159,235 A | 12/1964 | Young |
| 3,311,481 A | 3/1967 | Sterry |
| 3,549,473 A | 12/1970 | LeBlanc |
| 3,702,279 A | 11/1972 | Ardary |

(Continued)

FOREIGN PATENT DOCUMENTS

DE 3931976 8/2001

(Continued)

OTHER PUBLICATIONS

Anderson, Ultra Thin Wall Mat Design and Optimization with Hybrid Mats, SAE Technical Paper Series 2004-01-0145, Mar. 2004.

(Continued)

*Primary Examiner*—Tom Duong

(57) ABSTRACT

A diesel particulate filter assembly, and methods for use of such filter assembly, including a housing having an inlet end and an outlet end, a particulate filter portion consisting essentially of mullite fibers and positioned in the housing, an array of honeycomb channels in the filter, a porous wall between adjacent channels, and an exhaust path extending through the inlet end, through the particulate filter portion and though the outlet end.

5 Claims, 9 Drawing Sheets

U.S. PATENT DOCUMENTS

| | | |
|---|---|---|
| 3,752,683 A | 8/1973 | Hawthorne |
| 3,788,935 A | 1/1974 | Shyne |
| 3,795,524 A | 3/1974 | Sowman |
| 3,827,238 A | 8/1974 | Hayashi |
| 3,869,267 A | 3/1975 | Gaylor |
| 3,916,057 A | 10/1975 | Hatch |
| 3,920,404 A | 11/1975 | Gandhi |
| 3,927,152 A | 12/1975 | Kyrias |
| 3,929,671 A | 12/1975 | Nakamura et al. |
| 3,935,060 A | 1/1976 | Blome |
| 3,945,803 A | 3/1976 | Musall |
| 3,952,083 A | 4/1976 | Fletcher |
| 3,953,646 A | 4/1976 | Fletcher |
| 3,956,185 A | 5/1976 | Yagi et al. |
| 3,957,445 A | 5/1976 | Foster |
| 3,969,095 A | 7/1976 | Kurahashi |
| 3,978,567 A | 9/1976 | Vroman |
| 4,001,996 A | 1/1977 | Byrd, Jr. |
| 4,004,649 A | 1/1977 | Shimada |
| 4,007,539 A | 2/1977 | Nishio |
| 4,012,485 A | 3/1977 | Meguerian |
| 4,014,372 A | 3/1977 | Dichiara |
| 4,020,896 A | 5/1977 | Mold |
| 4,038,175 A | 7/1977 | Bhasin |
| 4,039,292 A | 8/1977 | Morini |
| 4,041,199 A | 8/1977 | Cartwright |
| 4,041,592 A | 8/1977 | Kelm |
| 4,047,965 A | 9/1977 | Karst et al. |
| 4,056,654 A | 11/1977 | Kompanek |
| 4,065,046 A | 12/1977 | Roberts |
| 4,092,194 A | 5/1978 | Green |
| 4,094,644 A | 6/1978 | Wagner |
| 4,094,645 A | 6/1978 | Bailey |
| 4,098,580 A | 7/1978 | Shimizu |
| 4,148,962 A | 4/1979 | Frosch |
| 4,156,533 A | 5/1979 | Close |
| 4,192,402 A | 3/1980 | Nakagawa |
| 4,195,063 A | 3/1980 | Iwaoka et al. |
| 4,206,177 A | 6/1980 | Otsubo |
| 4,208,374 A | 6/1980 | Foster |
| 4,239,733 A | 12/1980 | Foster |
| 4,276,071 A | 6/1981 | Outland |
| 4,290,501 A | 9/1981 | Tanaka |
| 4,297,328 A | 10/1981 | Ritscher |
| 4,319,556 A | 3/1982 | Schwartz |
| 4,324,572 A | 4/1982 | Erdmannsdorfer |
| 4,329,162 A | 5/1982 | Pitcher, Jr. |
| 4,335,023 A | 6/1982 | Dettling |
| 4,338,368 A | 7/1982 | Lovelace |
| 4,343,074 A | 8/1982 | Bailey |
| 4,345,430 A | 8/1982 | Pallo |
| 4,348,362 A | 9/1982 | Foss |
| 4,349,055 A | 9/1982 | Dichiara |
| 4,358,480 A | 11/1982 | Ecord |
| 4,379,109 A | 4/1983 | Simpson |
| 4,398,931 A | 8/1983 | Shevlin |
| 4,404,992 A | 9/1983 | Sasaki |
| 4,410,427 A | 10/1983 | Wydeven |
| 4,415,342 A | 11/1983 | Foss |
| 4,416,676 A | 11/1983 | Montierth |
| 4,417,908 A | 11/1983 | Pitcher, Jr. |
| 4,427,418 A | 1/1984 | Kogiso |
| 4,456,457 A | 6/1984 | Nozawa |
| 4,457,895 A | 7/1984 | Prigent |
| 4,483,108 A | 11/1984 | Howard |
| 4,495,399 A | 1/1985 | Cann |
| 4,508,256 A | 4/1985 | Radel |
| 4,529,718 A | 7/1985 | Dupin |
| 4,550,034 A | 10/1985 | Shimrock |
| 4,554,195 A | 11/1985 | Ormiston |
| 4,557,773 A | 12/1985 | Bonzo |
| 4,584,003 A | 4/1986 | Oda |
| 4,601,868 A | 7/1986 | Radel |
| 4,608,108 A | 8/1986 | Goll |
| 4,609,563 A | 9/1986 | Shimrock |
| 4,647,477 A | 3/1987 | DeLuca |
| 4,650,775 A | 3/1987 | Hill |
| 4,652,286 A | 3/1987 | Kusuda et al. |
| 4,671,911 A | 6/1987 | Garnier |
| 4,682,470 A | 7/1987 | Shaff |
| 4,686,128 A | 8/1987 | Gentilman |
| 4,696,711 A | 9/1987 | Greszczuk |
| 4,710,487 A | 12/1987 | Koch |
| 4,711,009 A | 12/1987 | Cornelison |
| 4,722,920 A | 2/1988 | Kimura |
| 4,732,593 A | 3/1988 | Kondo |
| 4,732,879 A | 3/1988 | Kalinowski |
| 4,735,756 A | 4/1988 | Rausch |
| 4,737,326 A | 4/1988 | Wirth |
| 4,749,674 A | 6/1988 | Dejaifve et al. |
| 4,759,918 A | 7/1988 | Homeier et al. |
| 4,761,323 A | 8/1988 | Muhlratzer |
| 4,818,625 A | 4/1989 | Lavendel |
| 4,828,774 A | 5/1989 | Andersson |
| 4,847,506 A | 7/1989 | Archer |
| 4,849,399 A | 7/1989 | Joy, III |
| 4,858,117 A | 8/1989 | Dichiara |
| 4,865,877 A | 9/1989 | Yamaguchi |
| 4,885,679 A | 12/1989 | Webster, Jr. |
| 4,890,285 A | 12/1989 | Dichiara |
| 4,894,070 A | 1/1990 | Keidel |
| 4,900,517 A | 2/1990 | Domesle et al. |
| 4,915,981 A | 4/1990 | Traskos |
| 4,916,897 A | 4/1990 | Hayashi |
| 4,925,561 A | 5/1990 | Ishii |
| 4,928,645 A | 5/1990 | Berneburg |
| 4,928,714 A | 5/1990 | Shannon |
| 4,929,429 A | 5/1990 | Merry |
| 4,934,142 A | 6/1990 | Hayashi |
| 4,935,178 A | 6/1990 | Esposito |
| 4,940,523 A | 7/1990 | Takeshima |
| 4,942,020 A | 7/1990 | Whittenberger |
| 4,952,896 A | 8/1990 | Dawson, Jr. |
| 4,955,164 A | 9/1990 | Hashish |
| 4,957,773 A | 9/1990 | Spencer |
| 4,968,383 A | 11/1990 | Volkmann |
| 4,970,035 A | 11/1990 | Baarsch |
| 4,976,760 A | 12/1990 | Helferich |
| 4,976,929 A | 12/1990 | Cornelison |
| 4,988,290 A | 1/1991 | Forster |
| 5,006,021 A | 4/1991 | Wheetley |
| 5,007,475 A | 4/1991 | Kennedy |
| 5,008,086 A | 4/1991 | Merry |
| 5,009,857 A | 4/1991 | Haerle |
| 5,013,405 A | 5/1991 | Izard |
| 5,015,610 A | 5/1991 | Dwivedi |
| 5,021,369 A | 6/1991 | Ackerman |
| 5,024,979 A | 6/1991 | Debaig-Valade |
| 5,028,397 A | 7/1991 | Merry |
| 5,043,244 A | 8/1991 | Cairncross |
| 5,053,062 A | 10/1991 | Barris |
| 5,062,911 A | 11/1991 | Hampton |
| 5,063,029 A | 11/1991 | Mizuno |
| 5,065,757 A | 11/1991 | Dragisic |
| 5,066,432 A | 11/1991 | Gabathuler |
| 5,070,591 A | 12/1991 | Quick |
| 5,075,160 A | 12/1991 | Stinton |
| 5,079,082 A | 1/1992 | Leiser |
| 5,087,272 A | 2/1992 | Nixdorf |
| 5,089,236 A | 2/1992 | Clerc |
| 5,100,632 A | 3/1992 | Dettling et al. |
| 5,102,639 A | 4/1992 | Chou et al. |
| 5,106,397 A | 4/1992 | Jaroszczyk |
| 5,114,901 A | 5/1992 | Tsang |

| | | | | | | |
|---|---|---|---|---|---|---|
| 5,117,939 A | 6/1992 | Noguchi | | 5,516,580 A | 5/1996 | Frenette |
| 5,124,302 A | 6/1992 | Lachman | | 5,519,191 A | 5/1996 | Ketcham |
| 5,151,819 A | 9/1992 | Stephens | | 5,523,059 A | 6/1996 | Langer |
| 5,154,373 A | 10/1992 | Scott | | 5,526,462 A | 6/1996 | Kondo |
| 5,154,894 A | 10/1992 | MacFarlane | | 5,536,562 A | 7/1996 | Tran |
| 5,154,901 A | 10/1992 | Yoshida | | 5,540,981 A | 7/1996 | Gallagher |
| 5,167,934 A | 12/1992 | Wolf | | 5,551,239 A | 9/1996 | Feeley |
| 5,168,085 A | 12/1992 | Addiego et al. | | 5,552,360 A | 9/1996 | Farrauto |
| 5,171,341 A | 12/1992 | Merry | | 5,553,455 A | 9/1996 | Craig |
| 5,173,349 A | 12/1992 | Yavuz | | 5,554,485 A | 9/1996 | Dichiara |
| 5,174,969 A | 12/1992 | Fischer | | 5,567,536 A | 10/1996 | Lintz |
| 5,179,061 A | 1/1993 | Haerle | | 5,569,441 A | 10/1996 | Engler |
| 5,180,409 A | 1/1993 | Fischer | | 5,582,805 A | 12/1996 | Yoshizaki |
| 5,182,249 A | 1/1993 | Wang et al. | | 5,589,143 A | 12/1996 | Mori |
| 5,186,903 A | 2/1993 | Cornwell | | 5,593,647 A | 1/1997 | Kirby |
| 5,194,078 A | 3/1993 | Yonemura | | 5,599,510 A | 2/1997 | Kaminsky |
| 5,195,319 A | 3/1993 | Stobbe | | 5,601,259 A | 2/1997 | Dichiara |
| 5,196,120 A | 3/1993 | White | | 5,611,832 A | 3/1997 | Suzuki |
| 5,210,062 A | 5/1993 | Narula | | 5,614,155 A | 3/1997 | Abe |
| 5,231,409 A | 7/1993 | Astier | | 5,618,500 A | 4/1997 | Wang |
| 5,232,671 A | 8/1993 | Brunson | | 5,626,951 A | 5/1997 | Hogenson |
| 5,238,386 A | 8/1993 | Cunningham | | 5,629,067 A | 5/1997 | Kotani |
| 5,244,852 A | 9/1993 | Lachman | | 5,629,186 A | 5/1997 | Yasukawa |
| 5,248,481 A | 9/1993 | Bloom | | 5,632,320 A | 5/1997 | Atmur |
| 5,248,482 A | 9/1993 | Bloom | | 5,637,399 A | 6/1997 | Yoshikawa |
| 5,250,094 A | 10/1993 | Chung | | 5,656,048 A | 8/1997 | Smith |
| 5,258,150 A | 11/1993 | Merckel | | 5,660,778 A | 8/1997 | Ketcham |
| 5,258,164 A | 11/1993 | Bloom | | 5,666,804 A | 9/1997 | Sekiya |
| 5,260,125 A | 11/1993 | Copes | | 5,670,443 A | 9/1997 | Irite et al. |
| 5,262,129 A | 11/1993 | Terada | | 5,672,389 A | 9/1997 | Tran et al. |
| 5,266,548 A | 11/1993 | Koradia | | 5,674,802 A | 10/1997 | Sheppard |
| 5,270,551 A | 12/1993 | Kamimura | | 5,686,039 A | 11/1997 | Merry |
| 5,271,906 A | 12/1993 | Yuuki | | 5,686,368 A | 11/1997 | Wong |
| 5,272,125 A | 12/1993 | Weible | | 5,687,046 A | 11/1997 | Mathews |
| 5,279,737 A | 1/1994 | Sekhar | | 5,687,787 A | 11/1997 | Atmur |
| 5,290,350 A | 3/1994 | Besnard | | 5,691,736 A | 11/1997 | Hunn |
| 5,294,409 A | 3/1994 | Cohen | | 5,692,373 A | 12/1997 | Atmur |
| 5,294,411 A | 3/1994 | Breuer | | 5,702,494 A | 12/1997 | Tompkins |
| 5,296,198 A | 3/1994 | Abe et al. | | 5,702,761 A | 12/1997 | Dichiara, Jr. |
| 5,296,288 A | 3/1994 | Kourtides et al. | | 5,705,118 A | 1/1998 | Hayes |
| 5,298,046 A | 3/1994 | Peisert | | 5,705,129 A | 1/1998 | Takahashi |
| 5,303,547 A | 4/1994 | Mieville | | 5,705,444 A | 1/1998 | Tompkins |
| 5,304,520 A | 4/1994 | Dwivedi | | 5,721,188 A | 2/1998 | Sung |
| 5,334,570 A | 8/1994 | Beauseigneur | | 5,723,403 A | 3/1998 | Durand et al. |
| 5,338,903 A | 8/1994 | Winberg | | 5,730,096 A | 3/1998 | Atmur |
| 5,339,629 A | 8/1994 | Winberg | | 5,732,555 A | 3/1998 | Gracyalny |
| 5,376,598 A | 12/1994 | Preedy | | 5,736,107 A | 4/1998 | Inomata |
| 5,378,142 A | 1/1995 | Kennelly et al. | | 5,742,254 A | 4/1998 | Bassaler |
| 5,380,580 A | 1/1995 | Rogers | | 5,744,763 A | 4/1998 | Iwasa |
| 5,380,621 A | 1/1995 | Dichiara | | 5,749,223 A | 5/1998 | Kreucher |
| 5,391,428 A | 2/1995 | Zender | | 5,750,026 A | 5/1998 | Gadkaree |
| 5,393,499 A | 2/1995 | Bagley | | 5,766,458 A | 6/1998 | Sekhar |
| 5,401,614 A | 3/1995 | Dichiara | | 5,772,154 A | 6/1998 | Stewart |
| 5,408,827 A | 4/1995 | Holtermann | | 5,773,143 A | 6/1998 | Vermilion |
| 5,409,669 A | 4/1995 | Smith | | 5,780,126 A | 7/1998 | Smith |
| 5,429,780 A | 7/1995 | Prin | | 5,783,515 A | 7/1998 | Sakurai |
| 5,436,216 A | 7/1995 | Toyao | | 5,795,456 A | 8/1998 | Friedman |
| 5,449,654 A | 9/1995 | Prin | | 5,801,806 A | 9/1998 | Dichiara |
| 5,451,444 A | 9/1995 | DeLiso | | 5,814,397 A | 9/1998 | Cagliostro |
| 5,453,116 A | 9/1995 | Fischer | | 5,827,577 A | 10/1998 | Spencer |
| 5,455,594 A | 10/1995 | Blasing | | 5,830,250 A | 11/1998 | Shirk |
| 5,456,965 A | 10/1995 | Machida | | 5,842,342 A | 12/1998 | Strasser |
| 5,458,944 A | 10/1995 | Austin | | 5,844,200 A | 12/1998 | Leader |
| 5,463,206 A | 10/1995 | Abe | | 5,849,375 A | 12/1998 | Smith |
| 5,466,917 A | 11/1995 | Matsuki | | 5,849,406 A | 12/1998 | Daws |
| 5,482,538 A | 1/1996 | Becker | | 5,851,647 A | 12/1998 | Foster |
| 5,482,817 A | 1/1996 | Dichiara | | 5,853,675 A | 12/1998 | Howorth |
| 5,486,399 A | 1/1996 | Brydon | | 5,853,684 A | 12/1998 | Fang |
| 5,487,865 A | 1/1996 | Hampton | | 5,856,263 A | 1/1999 | Bhasin |
| 5,497,620 A | 3/1996 | Stobbe | | 5,866,210 A | 2/1999 | Rosynsky |
| 5,501,842 A | 3/1996 | Rajnik | | 5,872,067 A | 2/1999 | Meng |
| 5,504,281 A | 4/1996 | Whitney | | 5,876,529 A | 3/1999 | Grant |
| 5,511,747 A | 4/1996 | Parrot | | 5,879,640 A | 3/1999 | Atmur |

| Patent | Kind | Date | Name |
|---|---|---|---|
| 5,882,608 | A | 3/1999 | Sanocki |
| 5,883,021 | A | 3/1999 | Beer |
| 5,884,864 | A | 3/1999 | Sunne |
| 5,907,273 | A | 5/1999 | Ross, Jr. |
| 5,910,095 | A | 6/1999 | Strasser |
| 5,914,187 | A | 6/1999 | Naruse et al. |
| 5,925,156 | A | 7/1999 | Motoki |
| 5,928,448 | A | 7/1999 | Daws |
| 5,928,775 | A | 7/1999 | Dichiara, Jr. |
| 5,932,496 | A | 8/1999 | Morris |
| 5,939,141 | A | 8/1999 | Cagliostro |
| 5,943,857 | A | 8/1999 | Ansell |
| 5,948,146 | A | 9/1999 | Thomaides |
| 5,948,257 | A | 9/1999 | Custer |
| 5,955,177 | A | 9/1999 | Sanocki |
| 5,972,810 | A | 10/1999 | Gabrisch |
| 5,976,997 | A | 11/1999 | Meaney |
| 5,980,837 | A | 11/1999 | Umin |
| 5,980,980 | A | 11/1999 | Dichiara, Jr. |
| 5,983,628 | A | 11/1999 | Borroni-Bird |
| 5,983,631 | A | 11/1999 | Mineo |
| 5,987,882 | A | 11/1999 | Voss |
| 5,987,885 | A | 11/1999 | Kizer |
| 5,989,476 | A | 11/1999 | Lockard |
| 6,013,599 | A | 1/2000 | Manson |
| 6,019,946 | A | 2/2000 | Castillo |
| 6,029,443 | A | 2/2000 | Hirota |
| 6,051,193 | A | 4/2000 | Langer |
| 6,058,918 | A | 5/2000 | Noetzlin |
| 6,074,699 | A | 6/2000 | Dichiara, Jr. |
| 6,077,600 | A | 6/2000 | Atmur |
| 6,090,744 | A | 7/2000 | Koda et al. |
| 6,099,671 | A | 8/2000 | Pearson |
| 6,101,714 | A | 8/2000 | Schmitt |
| 6,112,746 | A | 9/2000 | Kwok |
| 6,121,169 | A | 9/2000 | Carpenter |
| 6,152,722 | A | 11/2000 | Sick |
| 6,153,291 | A | 11/2000 | Strasser |
| 6,156,698 | A | 12/2000 | Iida |
| 6,157,349 | A | 12/2000 | Crouch |
| 6,166,283 | A | 12/2000 | Bharadwaj |
| 6,171,556 | B1 | 1/2001 | Burk |
| 6,174,565 | B1 | 1/2001 | Daws |
| 6,197,180 | B1 | 3/2001 | Kelly |
| 6,200,483 | B1 | 3/2001 | Cutler |
| 6,200,523 | B1 | 3/2001 | Quick |
| 6,200,538 | B1 | 3/2001 | Bruck |
| 6,200,706 | B1 | 3/2001 | Ashida |
| 6,210,786 | B1 | 4/2001 | Atmur |
| 6,214,072 | B1 | 4/2001 | Kappeler |
| 6,227,699 | B1 | 5/2001 | Wight, Jr. |
| 6,228,117 | B1 | 5/2001 | De Bruijn |
| 6,228,478 | B1 | 5/2001 | Kliwer |
| 6,237,587 | B1 | 5/2001 | Sparling |
| 6,238,467 | B1 | 5/2001 | Azarian |
| 6,238,618 | B1 | 5/2001 | Brundage |
| 6,242,712 | B1 | 6/2001 | Prust |
| 6,247,304 | B1 | 6/2001 | Kim |
| 6,248,684 | B1 | 6/2001 | Yavuz |
| 6,248,689 | B1 | 6/2001 | Manson |
| 6,251,498 | B1 | 6/2001 | Fukushima |
| 6,270,216 | B1 | 8/2001 | Dichiara |
| 6,277,016 | B1 | 8/2001 | Koide |
| 6,279,857 | B1 | 8/2001 | Roth |
| 6,284,201 | B1 | 9/2001 | Buck |
| 6,296,667 | B1 | 10/2001 | Johnson |
| 6,324,758 | B1 | 12/2001 | Huang |
| 6,340,360 | B1 | 1/2002 | Lyles |
| 6,341,662 | B1 | 1/2002 | Karlsson |
| 6,355,080 | B1 | 3/2002 | Dullien |
| 6,355,591 | B1 | 3/2002 | Kuvettu |
| 6,365,092 | B1 | 4/2002 | Backa |
| 6,393,835 | B1 | 5/2002 | Stoll |
| 6,397,603 | B1 | 6/2002 | Edmondson |
| 6,410,161 | B1 | 6/2002 | Li |
| 6,419,189 | B1 | 7/2002 | Dichiara, Jr. |
| 6,419,890 | B1 | 7/2002 | Li |
| 6,440,192 | B2 | 8/2002 | Guerin |
| 6,441,341 | B1 | 8/2002 | Steibel |
| 6,441,793 | B1 | 8/2002 | Shea |
| 6,444,006 | B1 | 9/2002 | Haberkamp |
| 6,444,271 | B2 | 9/2002 | Wittenauer |
| 6,449,947 | B1 | 9/2002 | Liu |
| 6,453,937 | B1 | 9/2002 | Tobias |
| 6,454,622 | B2 | 9/2002 | Mashiko |
| 6,455,122 | B1 | 9/2002 | Igashira |
| 6,465,742 | B1 | 10/2002 | Hiraoka |
| 6,479,104 | B1 | 11/2002 | Dichiara, Jr. |
| 6,484,723 | B2 | 11/2002 | Haas |
| 6,489,001 | B1 | 12/2002 | Cazzato |
| 6,494,936 | B1 | 12/2002 | Peacock |
| 6,494,979 | B1 | 12/2002 | Dichiara, Jr. |
| 6,495,168 | B2 | 12/2002 | West |
| 6,495,207 | B1 | 12/2002 | Prociw |
| 6,497,390 | B1 | 12/2002 | Fischer |
| 6,502,289 | B1 | 1/2003 | Kane |
| 6,509,088 | B2 | 1/2003 | Baxter |
| 6,511,355 | B1 | 1/2003 | Woodward |
| 6,513,526 | B2 | 2/2003 | Kwok |
| 6,514,040 | B2 | 2/2003 | Lewis |
| 6,521,321 | B2 | 2/2003 | Kahlbaugh |
| 6,531,078 | B2 | 3/2003 | Laine |
| 6,531,425 | B2 | 3/2003 | Golden |
| 6,533,930 | B1 | 3/2003 | Kool |
| 6,533,976 | B1 | 3/2003 | Strasser |
| 6,548,446 | B1 | 4/2003 | Koermer |
| 6,550,573 | B2 | 4/2003 | Wagner |
| 6,551,386 | B2 | 4/2003 | Weiler |
| 6,551,951 | B1 | 4/2003 | Fay |
| 6,555,211 | B2 | 4/2003 | Moody |
| 6,558,785 | B1 | 5/2003 | Rawal |
| 6,559,094 | B1 | 5/2003 | Korotkikh |
| 6,576,200 | B1 | 6/2003 | Yamamoto et al. |
| 6,584,768 | B1 | 7/2003 | Hecker |
| 6,601,385 | B2 | 8/2003 | Verdegan |
| 6,604,604 | B1 | 8/2003 | Badeau et al. |
| 6,605,259 | B1 | 8/2003 | Henry |
| 6,607,851 | B2 | 8/2003 | Dichiara, Jr. |
| 6,607,998 | B1 | 8/2003 | Lambert |
| 6,613,255 | B2 | 9/2003 | Dichiara, Jr. |
| 6,622,482 | B2 | 9/2003 | Knight |
| 6,630,115 | B1 | 10/2003 | Kaneeda |
| 6,632,110 | B2 | 10/2003 | Kato |
| 6,632,412 | B2 | 10/2003 | Peltola |
| 6,632,540 | B2 | 10/2003 | Dichiara, Jr. |
| 6,641,795 | B2 | 11/2003 | Abe |
| 6,652,446 | B1 | 11/2003 | Bove |
| 6,652,950 | B2 | 11/2003 | Barney |
| 6,660,115 | B2 | 12/2003 | Butler |
| 6,663,051 | B2 | 12/2003 | Okuyama |
| 6,663,839 | B2 | 12/2003 | Platvoet |
| 6,667,012 | B1 | 12/2003 | Anand et al. |
| 6,669,265 | B2 | 12/2003 | Tilton |
| 6,669,913 | B1 | 12/2003 | Haberkamp |
| 6,673,136 | B2 | 1/2004 | Gillingham |
| 6,673,414 | B2 | 1/2004 | Ketcham et al. |
| 6,676,077 | B1 | 1/2004 | Dichiara, Jr. |
| 6,676,745 | B2 | 1/2004 | Merkley |
| 6,682,706 | B1 | 1/2004 | Yamamoto et al. |
| 6,685,889 | B1 | 2/2004 | Raftery et al. |
| 6,692,712 | B1 | 2/2004 | Andersen |
| 6,698,193 | B2 | 3/2004 | Duerr |
| 6,699,342 | B2 | 3/2004 | Dichiara, Jr. |
| 6,699,555 | B2 | 3/2004 | Dichiara, Jr. |
| 6,712,318 | B2 | 3/2004 | Gubert |
| 6,726,884 | B1 | 4/2004 | Dillon |

| | | | |
|---|---|---|---|
| 6,770,584 B2 | 8/2004 | Barney | |
| 6,800,107 B2 | 10/2004 | Ishihara et al. | |
| 6,916,450 B2 | 7/2005 | Akama et al. | |
| 2001/0002287 A1 | 5/2001 | Kar | |
| 2001/0037729 A1 | 11/2001 | Machida | |
| 2001/0043891 A1 | 11/2001 | Adiletta | |
| 2002/0004450 A1 | 1/2002 | Gaffney | |
| 2002/0087042 A1 | 7/2002 | Schmidt | |
| 2002/0149128 A1 | 10/2002 | Dichiara, Jr. | |
| 2002/0150526 A1 | 10/2002 | Hopkins | |
| 2002/0157358 A1 | 10/2002 | Noda et al. | |
| 2002/0162325 A1 | 11/2002 | Kato et al. | |
| 2002/0189247 A1 | 12/2002 | Kato et al. | |
| 2002/0192512 A1 | 12/2002 | Dichiara, Jr. | |
| 2003/0003232 A1 | 1/2003 | Rosynsky | |
| 2003/0022783 A1 | 1/2003 | Dichiara, Jr. | |
| 2003/0032545 A1 | 2/2003 | Dichiara, Jr. | |
| 2003/0036477 A1 | 2/2003 | Nordquist | |
| 2003/0068153 A1 | 4/2003 | Suzuki | |
| 2003/0082414 A1 | 5/2003 | Dichiara, Jr. | |
| 2003/0115859 A1 | 6/2003 | Deeba | |
| 2003/0138585 A1 | 7/2003 | Dichiara, Jr. | |
| 2003/0152432 A1 | 8/2003 | Meece | |
| 2003/0165638 A1 | 9/2003 | Louks | |
| 2003/0183008 A1 | 10/2003 | Bang | |
| 2003/0205310 A1 | 11/2003 | Dichiara, Jr. | |
| 2004/0001781 A1 | 1/2004 | Kumar | |
| 2004/0001782 A1 | 1/2004 | Kumar | |
| 2004/0028587 A1 | 2/2004 | Twigg | |
| 2004/0031643 A1 | 2/2004 | Wagner | |
| 2004/0056151 A1 | 3/2004 | Dichiara, Jr. | |
| 2004/0091699 A1 | 5/2004 | Denham | |
| 2004/0091736 A1 | 5/2004 | Dichiara, Jr. | |
| 2004/0096619 A1 | 5/2004 | Dichiara, Jr. | |
| 2004/0132607 A1 | 7/2004 | Wood | |
| 2004/0176246 A1 | 9/2004 | Shirk | |
| 2005/0042151 A1 | 2/2005 | Alward et al. | |
| 2007/0289275 A1 | 12/2007 | Ohno et al. | |

FOREIGN PATENT DOCUMENTS

| | | |
|---|---|---|
| EP | 0044716 | 1/1982 |
| EP | 0047525 | 3/1982 |
| EP | 0187256 | 7/1986 |
| EP | 0278597 | 8/1988 |
| EP | 0358522 | 3/1990 |
| EP | 0244109 | 9/1990 |
| EP | 0412315 | 2/1991 |
| EP | 0124863 | 4/1991 |
| EP | 0421159 | 4/1991 |
| EP | 0433582 | 6/1991 |
| EP | 0202733 | 7/1991 |
| EP | 0441401 | 8/1991 |
| EP | 0251150 | 12/1991 |
| EP | 0471590 | 2/1992 |
| EP | 0500154 | 8/1992 |
| EP | 0554104 | 8/1993 |
| EP | 0561019 | 9/1993 |
| EP | 0236071 | 10/1993 |
| EP | 0345795 | 11/1993 |
| EP | 0570698 | 11/1993 |
| EP | 0588182 | 3/1994 |
| EP | 0668252 | 2/1995 |
| EP | 0431648 | 3/1995 |
| EP | 0648535 | 4/1995 |
| EP | 0380634 | 8/1995 |
| EP | 0600971 | 11/1995 |
| EP | 0704241 | 4/1996 |
| EP | 0618353 | 7/1996 |
| EP | 0727567 | 8/1996 |
| EP | 0734757 | 10/1996 |
| EP | 0737859 | 10/1996 |
| EP | 0750971 | 1/1997 |
| EP | 0769822 | 4/1997 |
| EP | 0692995 | 7/1997 |
| EP | 0790216 | 8/1997 |
| EP | 0819459 | 1/1998 |
| EP | 0599595 | 4/1998 |
| EP | 0687805 | 5/1998 |
| EP | 0473715 | 8/1998 |
| EP | 0884459 | 12/1998 |
| EP | 0705134 | 4/1999 |
| EP | 0830201 | 1/2000 |
| EP | 1052010 | 11/2000 |
| EP | 0835368 | 1/2001 |
| EP | 0835367 | 3/2001 |
| EP | 1085352 | 3/2001 |
| EP | 1125704 | 8/2001 |
| EP | 1163970 | 12/2001 |
| EP | 1180390 | 2/2002 |
| EP | 0906496 | 3/2002 |
| EP | 0856645 | 4/2002 |
| EP | 0958874 | 5/2002 |
| EP | 1205228 | 5/2002 |
| EP | 1254715 | 11/2002 |
| EP | 1222661 | 5/2003 |
| EP | 1326012 | 7/2003 |
| EP | 1331118 | 7/2003 |
| EP | 0912820 | 8/2003 |
| EP | 1342889 | 9/2003 |
| EP | 1032755 | 11/2003 |
| EP | 1366801 | 12/2003 |
| GB | 2208207 | 3/1989 |
| WO | WO-90/14224 | 11/1990 |
| WO | WO9303262 | 2/1993 |
| WO | WO9416134 | 7/1994 |
| WO | WO9620787 | 7/1996 |
| WO | WO9701599 | 1/1997 |
| WO | WO-97/48890 | 12/1997 |
| WO | WO-98/02649 | 1/1998 |
| WO | WO9927206 | 6/1999 |
| WO | WO9955459 | 11/1999 |
| WO | WO0008315 | 2/2000 |
| WO | WO0021903 | 4/2000 |
| WO | WO0070915 | 11/2000 |
| WO | WO0071863 | 11/2000 |
| WO | WO0154801 | 8/2001 |
| WO | WO0172663 | 10/2001 |
| WO | WO0173126 | 10/2001 |
| WO | WO0183959 | 11/2001 |
| WO | WO0194760 | 12/2001 |
| WO | WO0197952 | 12/2001 |
| WO | WO-03/004438 | 1/2003 |
| WO | WO03053542 | 7/2003 |
| WO | WO03068362 | 8/2003 |
| WO | WO03069595 | 8/2003 |
| WO | WO2004011783 | 2/2004 |
| WO | WO2004011785 | 2/2004 |
| WO | WO2004001807 | 3/2004 |

OTHER PUBLICATIONS

Ogunwumi et al., Aluminum Titanate Compositions for Diesel Particulate Filters, SAE Technical Paper Series 2005-01-0583, Apr. 2005.

Cutler et al., A New High Temperature Ceramic Material for Diesel Particulate Filter Applications, SAE Technical Paper Series 2000-01-2844, Oct. 2000.

Chant et al., Aluminum Clad Ferritic Stainless Steel Foil for Metallic Catalytic Converter Substrate Applications, SAE Technical Paper Series 960556, Feb. 1996.

Brogan et al., Recent Progress in NOx Trap Technology, SAE Technical Paper Series 980933, Feb. 1998.

Gulati, Physical Durability of Thin Wall Ceramic Substrates, SAE Technical Paper Series 982635, Oct. 1998.

Dou et al., Investigation of NOx Adsorber Catalyst Deactivation, SAE Technical Paper Series 982594, Oct. 1998.

Aaronson et al., Diesel Odor and the Formation of Aromatic Hydrocarbons During the Heterogeneous Combustion of Pure Cetane in a Single-Cylinder Diesel Engine, Thirteenth Symposium on Combustion, Aug. 1970.

Bascom et al., Design Factors that Affect Diesel Emissions.

Cooper et al., Role of NO in Diesel Particulate Emission Control.

Iiurn, Air Pollution and the Compression-Ignition Engine, Twelfth Symposium on Combustion, Jul. 1968.

Cooke, Inorganic Fibers—A Literature Review, Journal of the American Ceramic Society, 1991.

Fernando et al., Improving an Alumina Fiber Filter Membrane for Hot Gas Filtration Using an Acid Phosphate Binder, Journal of Materials Science, 2001.

Wall-Flow Monoliths, www.DieselNet.com, 2004.

Diesel Filter Materials, www.DieselNet.com, 2003.

Ceramic Catalyst Substrates, www.DieselNet.com, 1997.

Khair, Air-to-Air Intercooling of the Ford 7.8L Mid-Range Truck Diesel Engine, SAE Technical Paper Series 870534, Feb. 1987.

Khan et al., Progress of Diesel Combustion Research, CIMAC 9th International Congress on combustion Engines, 1971.

Lavoie et al., Experimental and Theoretical Study of Nitric Oxide Formation in Internal Combustion Engines, Combustion Science and Technology, 1970.

McCarthy, Diesel Fuel Property Effects on Exhaust Emissions from a Heavy Duty Diesel Engine that Meets 1994 Emissions Requirements, SAE Technical Paper Series 922267, Oct. 1992.

Merrion, Effect of Design Revisions on Two Stroke Cycle Diesel Engine Exhaust.

Nakatsuji et al., Highly Durable NOx Reduction System and Catalysts for NOx Storage Reduction System, SAE Technical Paper Series 980932, Feb. 1998.

Miyamoto et al., Description of Diesel Emissions by Individual Fuel Properties, SAE Technical Paper Series 922221, Oct. 1992.

Komiyama et al., Predicting NOx Emissions and Effects of Exhaust Gas Recirculation in Spark-Ignition Engines, Society of Automotive Engineers, May 1973.

Marshall et al., Factors Influencing Diesel Emissions, Society of Automotive Engineers, Inc., Aug. 1968.

Newhall et al., Direct Spectroscopic Determination of Nitric Oxide in Reciprocating Engine Cylinders, Society of Automotive Engineers, Inc., Jan. 1967.

Olson, Diesel Emission Control Devices—Design Factors Affecting Mounting Mat Selection, SAE Technical Paper Series 2004-01-1420, Mar. 2004.

Page, Optimization of the Air/Fuel Ratio for Improved Engine Performance and Reduced Emissions, SAE Technical Paper Series 961714, Aug. 1995.

Perez et al., Exhaust Emission Characteristics of Precombustion Chamber Engines.

Tuomola et al., A New Metallic Catalyst, SAE Technical paper Series 2002-01-0357, Mar. 2002.

Pischinger, The Diesel Engine for Cars—Is There a Future?, ICE Fall Technical Conference, 1996.

Wright et al., A Novel Electrostatic Method of Ultrafine PM Control Suitable for Low Exhaust Temperature Applications, SAE Technical Paper Series 2003-01-0771, Mar. 2003.

Watts et al., Air Motion and Fuel Distribution Requirements in High-Speed Direct Injection Diesel Engines, The Institution of Mechanical Engineers, 1969-70.

Ullman et al., Effects of Fuel Aromatics, Cetane Number, and Cetane Improver on Emissions from a 1991 Prototype Heavy-Duty Diesel Engine, SAE Technical Paper Series 902171, Oct. 1990.

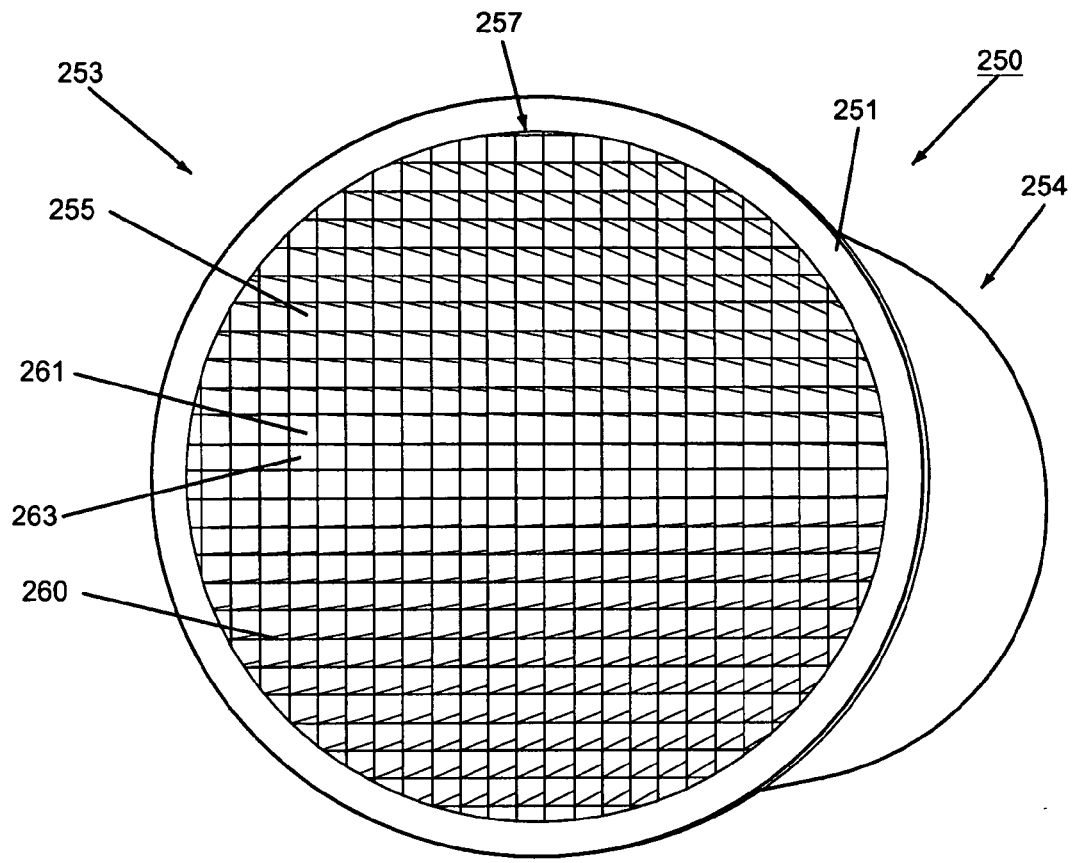
FIG. 6A
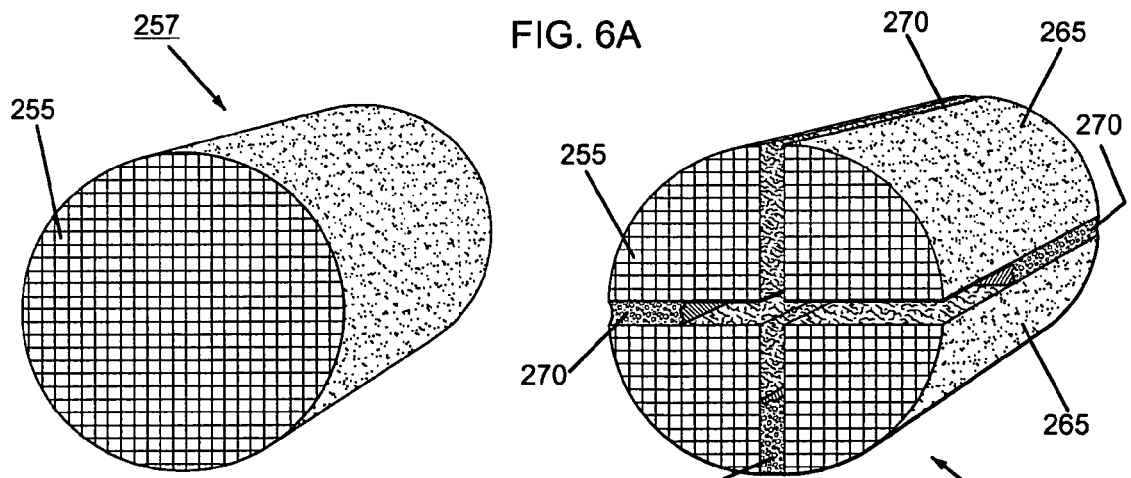
FIG. 6B
FIG. 6C

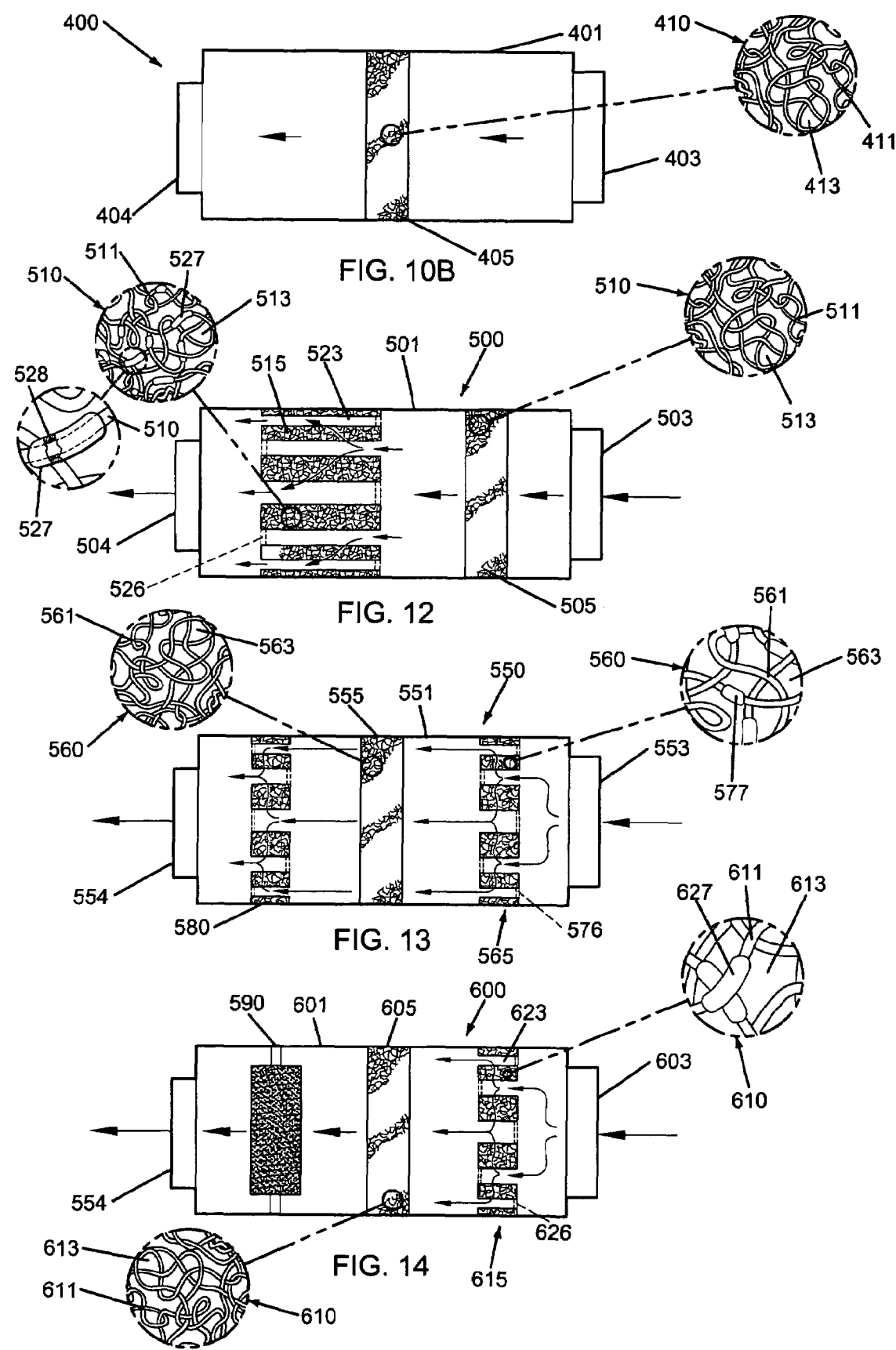

MULTI-FUNCTIONAL SUBSTANTIALLY FIBROUS MULLITE FILTRATION SUBSTRATES AND DEVICES

RELATED APPLICATIONS

This application is a continuation-in-part of U.S. patent application Ser. No. 10/833,298, filed Apr. 28, 2004, now U.S. Pat. No. 7,550,117 and entitled "Nonwoven Composites and Related Products and Processes", which is a continuation-in-part of U.S. patent application Ser. No. 10/281,179, filed Oct. 28, 2002, and entitled "Ceramic Exhaust Filter", now U.S. Pat. No. 6,946,013, both of which are incorporated herein as if set forth in their entirety.

BACKGROUND

1. Field

The present invention relates generally to a filter for removing particulate matter from an exhaust gas, and more particularly to a monolithic particulate filter.

2. Description of Related Art

An exhaust system for an engine is often required to reduce particulate pollutants, and therefore typically includes a particulate filter. One type of particulate filter is useful for trapping diesel exhaust particulate, and, therefore is commonly referred to as a Diesel Particulate Filter (DPF). A typical DPF is constructed from a block of ceramic material, such as cordierite (Magnesium Aluminum Silicate) or silicon carbide. Sometimes the DPF is metallic. The cordierite block may be extruded with parallel channels, which are used to direct an exhaust gas through the filter from an inlet port to an outlet port. Generally, the DPF is constructed to function using a wall-flow process. Sometimes the DPF is constructed to take advantage of a donut-shaped geometry. In either case, the exhaust gas is forced to go through a wall where the filtration of the particulates takes place. However, known filters have been found to have undesirable effects related to mechanical strength, filter backpressure (becoming especially as the filter becomes loaded with particulates), regeneration efficiency and soot trapping & ash storage efficiencies.

The most common DFP design incorporates a wall flow process. With the wall-flow process, half of the parallel channels are blocked at the inlet side and the other half are blocked at the outlet side, forcing exhaust gas to at least once pass through the solid but porous filter walls as it travels from the exhaust gas source through the filter and, ultimately, to the atmosphere. In this way, gas enters the inlet channels at the inlet side, and because the channels are blocked, is forced through a porous wall into an adjacent outlet channel. The outlet channel then directs the filtered exhaust gas to an outlet port for transition into the atmosphere. Since all (or at least nearly all) the exhaust gas must pass through at least one porous wall, the wall flow process may more effectively remove soot. However, in this process, trapped soot rapidly cakes on the surface of the channel wall, thus progressively blocking gas flow paths through the porous walls and contributing to (typically quick) a rise in backpressure. Also, since the gases are being forced though the walls, even newly constructed or freshly regenerated wall-flow filters may be characterized by unacceptably high backpressures.

In general, DPF designs to date suffer from such cake filtration effects arising from soot build-up on the wall surfaces. As soot collects on top of the surface of the porous wall, the effective diameter of the channel is reduced, leading to a sharp rise in backpressure. This soot must be occasionally burned off to clear the filter and regenerate the filtering effects of the DPF. This regeneration may be done in response to the detection of increased backpressure, in response to the detection of an excess level of particulate matter in the exhausted gases, or simply as a routine precaution. It will be appreciated that several methods for regeneration are well known. For example, the DPF may be heated during normal operation to a temperature sufficient to regenerate the filter. Alternately, the fuel system may inject fuel into the filter from time to time, thereby increasing the filter's temperature to facilitate burn off. Still alternately, the filter may be manually removed from the exhaust system and heated burn off accumulated soot.

Although regeneration is an important aspect of DPF design and use, the threat of an uncontrolled regeneration limits the practicability of automated regeneration processes. For example, an uncontrolled regeneration may result when, during normal regeneration or even during normal operation, the natural heat dissipation processes are interrupted. In one specific example, a DPF enters a regeneration cycle with the engine operating at normal highway cruising speeds. In this use, the DPF may reach a temperature of up to 700 to 900 degrees Celsius while regenerating. However, if the car were to suddenly stop, such as due to stop-and-go traffic, the engine speed would dramatically drop, and along with it the flow of exhaust gas through the DPF. Since exhaust gas flow is at least partially responsible for moving excess heat out of the DPF, such an event may trigger the temperature of the DPF to rise dramatically. In some cases, the temperate of the DPF may reach 1200 or 1300 degrees Celsius, or even higher.

In the presence of the very high temperatures observed in uncontrolled soot regenerations, some refractory ceramic materials exhibit undesirable reactions such as phase transitions or the formation of phases/eutectics in the presence of impurities. These impurities may be in the material itself, or extracted from the exhaust gases (such as ash-content in exhaust particulate matter). The reactions may cause a decrease in strength, melting point, or generate undesirable byproducts, resulting in physical weakening or chemical degradation of the DPF. In some cases, such as reactions in the DPF may also lead to sintering of the catalyst and washcoat, thereby reducing their efficiency. In one example, free silica in glass fibers can "flow" or creep at high temperatures leading to a substantial decrease in the strength of the filter body. Additionally, at temperatures above 1300 C, silica can also convert to crystalline form of cristobalite that may have negative health effects. Under high thermal gradients experienced during such regeneration events, the substrate may experience severe thermally induced stresses, leading to cracks and faults.

With the undesirable backpressure and regeneration characteristics of cordierite and other similar refractory ceramics, other materials and processes have been tried in the filtration of particulates from exhaust stream. For example, silicon carbide has exhibited promising material characteristics, but is extremely heavy, expensive, and filters are typically constructed of several blocks joined together with an adhesive, such as a cement or glue. These joined blocks are subject to breakage, are difficult to form into a precise honeycomb arrangement and often suffer from increased back pressure from fluid flow discontinuities inherent in the use of adhesive at the block-block interfaces. Accordingly, a silicon carbide DPF is typically too expensive, too heavy, and too difficult to manufacture for mass production use. Typically in the automotive industry, the ratio of liters of substrate to the engine displacement ranges from about 1 to about 2. This means that for a 6 liter engine, a full DPF system would require about 6-12 liters of honeycomb substrate (given the existing state of filtration engineering and ash storage capabilities). This would make the exhaust system prohibitively heavy, and would contribute to vehicle instability, necessitate underbody redesign and balancing, and would be accompanied by an inherent fuel penalty.

In another alternative, the DPF is formed from a block of ceramic that includes ACM mullite whiskers. Such mullite whiskers are typically single crystal mullite and have a needle morphology. The addition of these mullite needles improves refractory characteristics, and may also increase block porosity. For example, when used in a ceramic block, the porosity of the block may be increased to about 60%. However a filter constructed using ACM needles still exhibits an undesirably high backpressure, as well as suffering from relatively low wall strength. The process for creating these whisker-based ceramics is extremely expensive, often requiring expensive gases that are potentially dangerous to human health and industrial equipment. In such systems, it also becomes necessary to plug the substrates after the initial firing of the ceramic pre-cursor material, increasing in total cost of the wall flow DPF substrate.

Another type of filter is the fiber-wound or donut-shape substrate that includes metallic or ceramic fibers in a donut shape substrate. Such designs were created for HEPA air-filtration and are now being applied to exhaust remediation. Such designs provide low surface area for soot regeneration, are typically mechanically weak and contribute to rapid backpressure increases with soot trapping.

Accordingly, there is a need for a particulate filter, and, in particular, a DPF, that efficiently captures soot, does not contribute excessively to backpressure, and can safely survive the rigors of uncontrolled regeneration. The present invention addresses this need.

SUMMARY

Briefly, the present invention provides an improved particulate filter system. More particularly, the invention provides a highly porous substantially fibrous mullite body characterized by sufficient interconnected, open-cell porosity to allow the flow of exhaust gas therethrough without significantly contributing to an increase in backpressure, but where the pores are sufficiently small such that particulate matter, and in particular as dust and soot, is substantially filtered out. The porosity of the fibrous mullite body is typically between about 60 percent and about 90 percent. The fibrous mullite body is formed with a plurality of small and generally parallel channels extending therethrough. The channels are typically blocked at alternating ends to force gas traveling therethrough to pass through at least one fibrous mullite walls, whereupon particulate matter in the flowing gas is substantially filtered out. Such a device has the capability of filtering out particulates that are much smaller than the average pore-size in the body itself due to the filtration mechanisms related to depth filtration.

In a more specific example, the catalytic device is constructed as a DPF and includes a housing defining an inlet end and an outlet end. The housing supports a particulate filter body made up of intertangled mullite fibers. A plurality of small channels are formed extending through the body, such as by extrusion or broaching, defining porous mullite fiber walls between adjacent channels. The channels are typically blocked at alternating ends in order to force gas flowing into the inlet to flow through at least one wall in order to reach the outlet. A typical exhaust path thus extends from the inlet to the outlet and though at least some of the porous walls.

In another specific example, the catalytic device is constructed as a catalytic filter assembly. A gas permeable filter body is formed from intertangled mullite fibers to define an open pore structure. A plurality of small channels are typically formed in the filter body and define porous mullite fiber walls between adjacent channels. An exhaust path thus extends from the inlet to the outlet; the exhaust path thus directs flowing exhaust gas into contact with the fibrous walls and through at least some of the porous walls. Typically, a catalyst material is disposed onto at least some of the fibers making up the body, such that the exhaust gas is very likely to contact catalyst material on its way from the inlet to the outlet. The catalyst material is selected to facilitate the reaction of undesirable and typically non-particulate species found in the exhaust gas into more desirable species.

In another specific example, the DPF is constructed in a cartridge-type donut-shaped filter where the filtering wall is constructed such that the wall forms a hollow cylinder. The exhaust gas enters the center (inner core) of the cylinder and is forced through the inner cylindrical wall surface, through the porous wall, and out the opposite outer wall surface. The exhaust gas is filtered as it passes through the cylindrical wall, since the wall is composed of substantially fibrous porous refractory ceramic (i.e., mullite) material.

Advantageously, the particulate filter device provides a fibrous mullite filtration body that has a low thermal mass, high porosity, high emissivity, low conductivity, faster burn off of soot, high trapping efficiency, stability at normal operational temperatures, and allows for depth filtration. Further, the mullite DPF operates safely at temperatures over 1300 degrees Celsius. These and other features of the present invention will become apparent from a reading of the following description, and may be realized by means of the instrumentalities and combinations particularly pointed out in the appended claims.

DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 6A is an end view of a flow-through particulate filter assembly having a fibrous mullite wall-flow substrate in accordance with the present invention.

FIG. 6B is a perspective view of the fibrous mullite wall-flow substrate of FIG. 6A.

FIG. 6C is a partial sectional view of the fibrous mullite wall-flow of FIG. 6B as formed from cemented sections.

FIG. 12 is a schematic view of a filter assembly including a monolithic wall flow particulate filtration substrate and a fibrous mullite flow-through catalytic conversion substrate in accordance with the present invention.

FIG. 13 is a schematic view of a filter assembly including a monolithic wall flow particulate filtration substrate and a pair of oppositely disposed monolithic flow through catalytic conversion substrates in accordance with the present invention.

FIG. 14 is a schematic view of a filter assembly including a monolithic wall flow particulate filtration substrate, a fibrous mullite flow-through catalytic conversion substrate and a third fluid cleaning element in accordance with the present invention.

DETAILED DESCRIPTION

Figure 1:
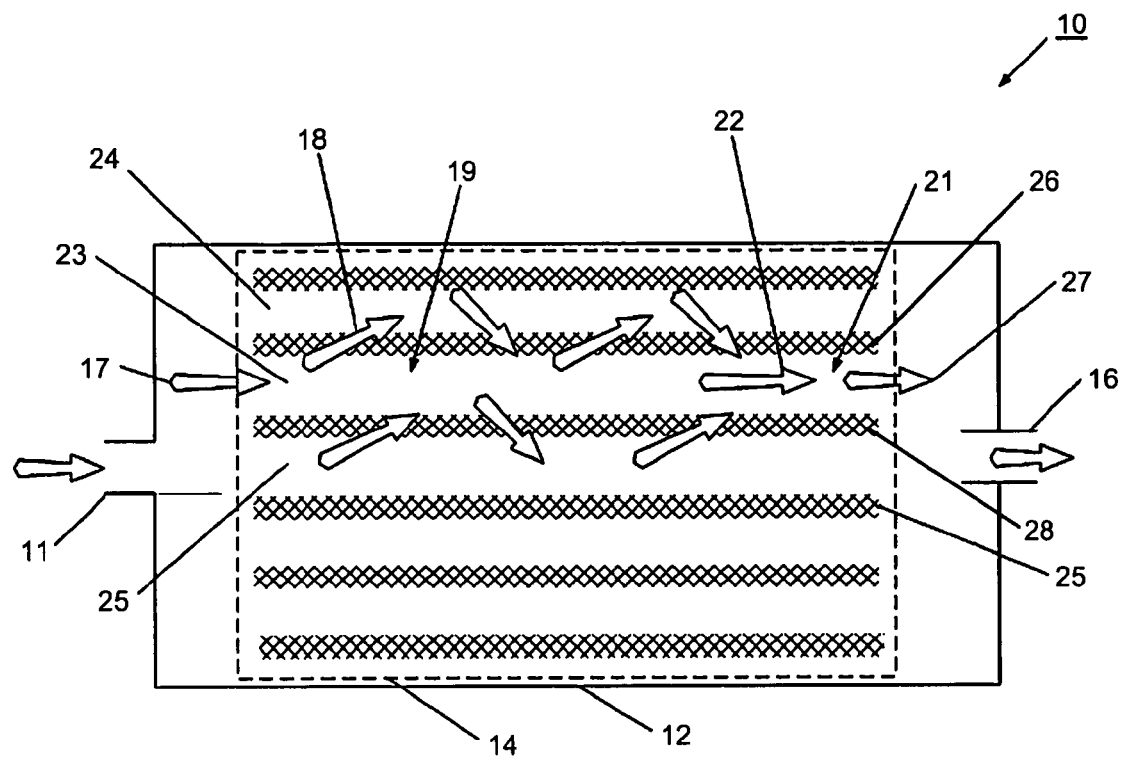
FIG. 1 is a diagram of a flow-through particulate filter assembly in accordance with the present invention.

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

The drawing figures herein illustrate and refer to an exhaust system pathway that is, for the most part, specifically described as a component of an internal combustion engine exhaust system. However, it should be appreciated that the exhaust pathway may be used on other types of exhaust systems. For example, the exhaust system may be a fluidic flow system in the petrochemical, biomedical, chemical processing, painting shops, laundromat, industrial exhaust, power generation plant, water-filtration, oil-most removal, air-purification, deodorizer application, ozone-removal, or commercial kitchen applications. The exhaust gasses may simply be a mixture of fluids that may typically also contain solid components. In instances where fluids do not contain filterable solid components, some constituents of the fluids may be converted into new chemical species via catalytic reactions occurring as the fluid passes through the substrate of the present invention.

Mullite is the mineralogical name given to the only chemically stable intermediate phase in the $SiO_2$—$Al_2O_3$ system. The natural mineral is rare, naturally occurring on the Isle of Mull off the west coast of Scotland. Mullite is commonly denoted as $3Al_2O_3 \cdot 2SiO_2$ (i.e. 60 mol % $Al_2O_3$ and 40 mol % $SiO_2$). However, this is misleading since mullite is actually a solid solution with the equilibrium composition limits of between about 60 and 63 mol % alumina below 1600° C. Mullite is an attractive material for refractory applications since it is characterized by excellent high temperature properties, such as good thermal shock resistance and thermal stress distribution arising from its low coefficient of thermal expansion, good strength and interlocking grain structure. Mullite is also characterized by relatively low thermal conductivity and high wear resistance. These properties do not suffer much at elevated temperatures, allowing mullite materials to remain usable at high temperatures.

The following table summarizes the physical properties of mullite:

Mullite Properties

Mullite

| | Units of Measure | SI/Metric | (Imperial) |
|---|---|---|---|
| Mechanical | | | |
| Density | gm/cc (lb/ft$^3$) | 2.8 | (175) |
| Porosity | % (%) | 0 | 0 |
| Color | — | off-white | off-white |
| Flexural Strength | MPa (lb/in$^2$ × 10$^3$) | 180 | (26) |
| Elastic Modulus | GPa (lb/in$^2$ × 10$^6$) | 151 | (22) |
| Shear Modulus | GPa (lb/in$^2$ × 10$^6$) | — | — |
| Bulk Modulus | GPa (lb/in$^2$ × 10$^6$) | — | — |
| Poisson's Ratio | — | — | — |
| Compressive Strength | MPa (lb/in$^2$ × 10$^3$) | 1310 | (190) |
| Hardness | Kg/mm$^2$ | 1070 | — |
| Fracture Toughness $K_{IC}$ | MPa · m$^{1/2}$ | 2 | — |
| Maximum Use Temperature (no load) | ° C. (° F.) | 1650 | (3000) |
| Thermal | | | |
| Thermal Conductivity | W/m · ° K (BTU · in/ft$^2$ · hr · ° F.) | 6 | (42) |
| Coefficient of Thermal Expansion | 10$^{-6}$/° C. (10$^{-6}$/° F.) | 5.4 | (3) |
| Specific Heat | J/Kg · ° K (Btu/lb · ° F.) | — | — |
| Electrical | | | |
| Dielectric Strength | ac-kv/mm (volts/mil) | 9.8 | (245) |
| Dielectric Constant | @ 1 MHz | 5.8 | 5.8 |
| Dissipation Factor | @ 1 kHz | 0.003 | 0.003 |
| Loss Tangent | — | — | — |
| Volume Resistivity | ohm · cm | >10$^{13}$ | |

Various starting materials and preparation methods are used to make synthetic mullite ceramics. For example, mullite precursors include powdered solids, polymers, sols, and the like. Likewise, a variety of preparation methods exist, such as the reaction sintering of mechanically mixed powders, hydrothermal treatment of sol preparations and chemical vapor deposition. Since mullite is a solid solution, the properties of any given batch are influenced by its preparation and history. Reaction sintered mullite made from mechanically mixed powders is usually characterized by low strength and low fracture toughness due inhomogeneities in the mixing process that contribute to amorphous and/or unevenly distributed grain boundary phases. In contrast, mullite produced via gelation is typically characterized by intimately mixed sub-micron particles that lend themselves to such processing techniques as sintering and hot pressing to yield mullite products with superior mechanical properties. The mechanical properties of mullite may be further improved through the additions of ceramic species such as $Zr_2O$ and SiC to yield composite materials with especially high toughness.

Mullite is also one of the important constituents of porcelain. Clays with less than about 60% $Al_2O_3$ tend to convert to mullite. The amount of mullite produced is directly related to the amount of $Al_2O_3$ as well as to the calcining temperature. However, the greatest application of mullite-based products remains the area of refractories. Mullite is important to the steel industry, where refractoriness, high creep resistance, and thermal shock resistance are paramount. For example, high-mullite refractories are commonly used in blast stove checker bricks. Many refractories in use in the steel industry are at least partially composed of mullite-based aggregate.

The glass industry also uses mullite-based refractories in tank structures, checker bricks, burner blocks, ports and the like. Mullite's combination of strength at elevated temperatures, thermal shock resistance, chemical stability and resistance to attack, and creep resistance combine to make mullite an attractive glass industry refractory.

The aluminum and petrochemical industries also favor mullite for applications requiring chemical attack resistance, thermal shock resistance and hot-load strength. Like the glass industry, the aluminum and petrochemical industries also use mullite-based aggregates for applications requiring chemical attack resistance, thermal shock resistance and hot-load strength. New mullite materials that have more controlled mechanical and physical properties and are providing opportunities for a wider use of the material. Mullite is also popular as a material for such traditional ceramic uses as kiln furniture material for supporting ceramic ware during firing as well as for such less traditional ceramic applications as turbine engine components.

FIG. 1 shows a filter assembly 10 having a housing portion 12 and a filter portion 14. The housing portion 12 includes an inlet port 11 for receiving an exhaust gas and an outlet port 16 for venting cleaned exhaust gas. Filter 14 is typically constructed from a porous nonwoven ceramic body or block having a plurality of (typically parallel) channels formed therethrough, such as channels 23, 24, and 25. The filter body 14 is typically formed as a monolith, but may also be formed from sections joined together, such as by cement, glue or other convenient means. The channels 23-25 are typically parallel and are typically formed in situ during the formation of the body 14. For example, the body may be formed by extrusion with the channels 23-25 simultaneously extruded thereinto. Alternately, the channels 23-25 may be cut, broached or otherwise formed via any convenient processes in the as-formed green or fired body 14. Typically, however, filter body 14 is formed as a substantially fibrous fluid permeable monolithic block.

The filter body 14 is characterized by intertangled polycrystalline mullite fibers as its primary component. It will be appreciated that other substances, such as binders, glass-formers, glass-ceramic pre-cursors, ceramic pre-cursors, strengthening agents, whiskers, mullite whisker pre-cursors, or the like may be added in relatively small amounts to adjust the physical and/or chemical characteristics of the body 14 as desired.

Although the following discussion is directed at the specific example of removing particulate matter from an exhaust gas stream, it should be kept in mind that the following is likewise applicable to the removal of undesirable particulate matter from fluids in general. In use, 'dirty' exhaust gas to be cleaned or filtered of particulate and/or chemical constituents (such as by catalytic reaction) enters inlet port 11. The exhaust gas flows through each of the parallel channels, such as channel 23; for exemplary purposes, exhaust gas flow paths are generally shown for channel 23. Some gas entering channel 23 passes through channel wall 26 into adjacent channel 24, as shown by arrow 18. Gas that enters adjacent channel 24 has been at least partially cleaned and is exhausted out the outlet port 16. Other gasses entering channel 23 may pass into adjacent channel 25, where it is likewise at least partially cleaned by passage through the channel wall portion 28 and then is exhausted through outlet port 16. Further, some gas may flow generally directly through channel 23 as indicated by arrow 22, interacting with the channel walls 26, 28 via diffusion. In this way, filter 14 facilitates filtering through a combination of flow-through and wall flow processes.

The composition and construction of the filter block, including mullite fibrous walls 26, 28, is typically according to the following ranges:

| | |
|---|---|
| Form Factor | Honeycomb |
| Cell Density | 100-300 cells/sq. in (100-200 typical) |
| Cell Shape | Square, round, oval, pentagonal, Hepa or doughnut (hollow cylindrical) |
| Channel shape | Inlets typically larger than outlets to reduce backpressure generation and ash storage capacity |
| Wall Thickness | 10-40 mils (20-30 typical) |
| Porosity | 60% to 90% (75% to 85% typical) |
| Pore size | 15 to 100 microns (about 15-30 microns typical) |
| Pore formation | Pores are typically formed, dispersed, shaped and/or oriented by introducing volatile (typically organic) particulates (such as spheres, flakes, fibers, etc . . . ) during green body formation; these volatile pore-formers are burned off during curing and so leave voids of a predefined shape and size |
| Fiber orientation | For extruded bodies, the fibers are typically at least partially oriented parallel to the main axis of extrusion. Other processes, such as isostatic pressing, may result in bodies wherein the fibers are oriented completely randomly (anisotropic) or even perpendicular to bodies main axis |
| Primary component | Mullite fibers (typically from about 70% to about 95%) |
| Fiber diameter | Typically 2-10 micron, more typically between about 6 and about 10 microns; larger diameter tends to increase body strength and reduces health risks during processing |
| Aspect ratio | 5 to 1000 (5 to 30 typical); aspect ratio is an indicator of fiber packing density and thus affects ease of extrusion, filtration efficiency, thermo-mechanical strength, thermal expansion characteristics, and pore size |
| Additives | Ceramic particulate (typically from 0% to about 20%); typically selected to improve plasticity and |

-continued

| | |
|---|---|
| | extrudability, aid in fiber-to-fiber binding, and/or aid the sintering process; leads to thermo-mechanical strength |
| Mullite Wiskers | If added, from about 1% to 10%, typically to increase strength |
| Emissivity additives and coatings | Added to increases emissivity and heat reflectance of the body; leads to faster light-off, regeneration and low thermal absorption. |
| Glass, glass-ceramic, ceramic precursors | Added to tailor fiber-to-fiber bonding properties; can selectively toughen body by making failure mode less brittle at high temperatures |
| Primary product | 5.66" by 6" body |
| | 100 cells per square inch with 30 micron walls |
| | 200 cells per square inch with 20 micron walls |
| | 200 cells per square inch with 12 micron walls |
| | 3" by 4" body |
| | 3.75" by 6" body |
| | 8" by 8" body |
| | 12" by 12" body |
| | 12" by 15" body |
| Soot loading | 5, 8, 10, 15 grams per liter (typical) |
| Exemplary uses | DOC, DPF, SCR (selective catalytic reduction), LNT (lean NOx trap), close-coupled DOC, DPNR, wall-flow filter, cross-flow filter, air filter/purifier, water-purifier, bio-reactor |
| DPF systems | Active, passive or fuel-borne catalyst systems |
| Light-off | In CO oxidation reaction, $T_{95}$ (temperature to reach 95% conversion efficiency) was about 400 degrees Fahrenheit while comparable cordierite 400 cpsi was 700 degrees Fahrenheit. |
| Filtration efficiency | Typically >97%; some embodiments with >50% filtration efficiency |
| Regeneration | Typically 30% to 50% faster than traditional non-fiber filters |
| Operating temp | Efficient operation at temperatures exceeding 1000 degrees Celsius; typically safely to over 1300 degrees Celsius; more typically safely up to 1500 degrees Celsius |
| Thermal Mass | Very low to support fast light off and lower overall mass of filtration and catalytic conversion assembly |
| Chemical Reactivity | Relatively inert; non-reactive with internal combustion engine exhaust gas or condensates, ash constituents (such as metal oxides or base-metal oxides), acids (except for very strong acids), alkalis, organics, salts, inorganic sols |
| Catalyst adherence | Easily coated by washcoat (e.g. gamma-alumina, ceria, tin oxide, titanium oxide) materials as well as traditional catalysts (e.g. platinum, palladium, rhodium, perovskites, base-metal oxides, lanthanates, vanadium or tungsten oxides) using slurry or aqueous solution based processes; can easily be coated with zeolites, inorganic and organic membranes, algae, enzymes, bio-reactor catalysts, reagents |

Figure 2:
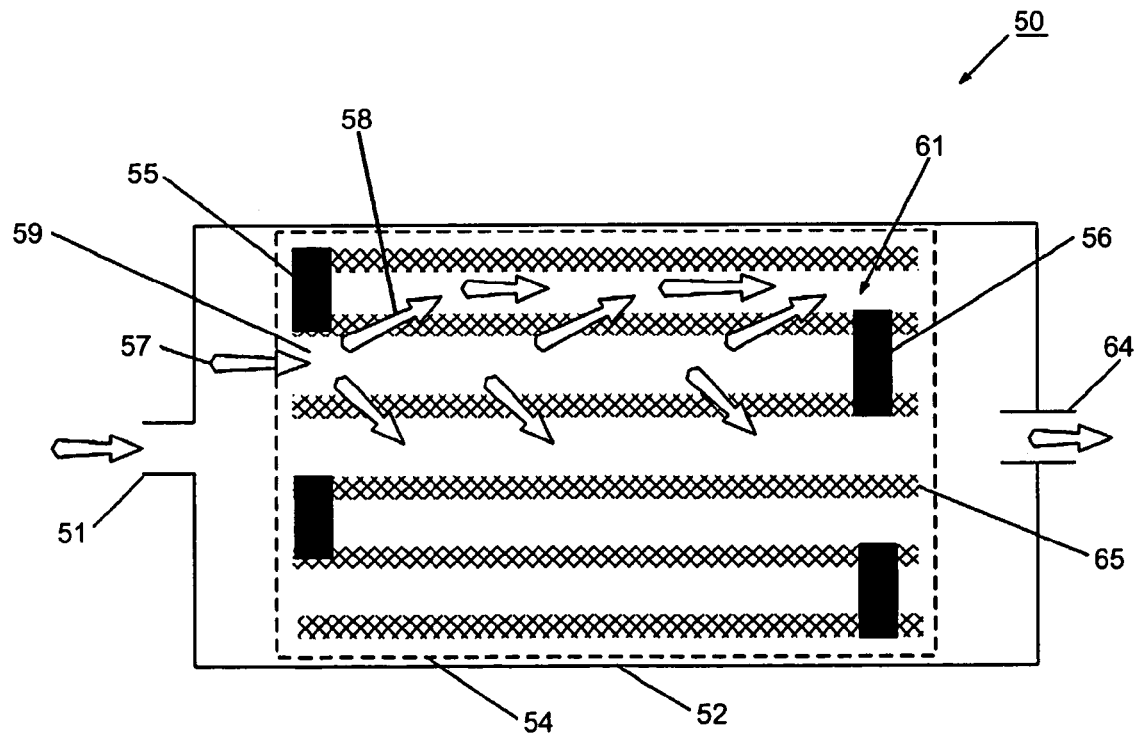
FIG. 2 is a diagram of a wall-flow particulate filter assembly in accordance with the present invention.

FIG. 2 shows filter assembly 50 having parallel channels enclosed in a housing 52. Substantially gas-impermeable output channel blocks 55 are positioned in outlet channels 61 and substantially gas-impermeable inlet blocks 56 are positioned in inlet channels 59. Typically the blocks 55, 56 are made of the same material (more typically fibrous mullite) as the rest of the filter body 14. More typically, the blocks 55, 56 may be made of he same material as the rest of the filter body 14 but with less organic constituents in the unfired stage to yield substantially gas-impermeable blocks 55, 56. These blocks 55, 56 prevent the direct flow of gas 57 completely through any given channel 59, 61 and thus restrict the filter 54 to operate substantially exclusively by the wall flow filter mechanism. In other words, by forcing gas entering the filter assembly 50 through the inlet port 51 to be directed into an inlet channel 59 and by urging the gas, via a gas pressure differential between the inlet port 51 and the outlet port 64 arising from the output pressure of the gas source, to diffuse through 58 a porous wall 65 into an outlet channel 61, the filter assembly 50 is limited to operate substantially solely according to the wall flow mechanism.

Figure 3:
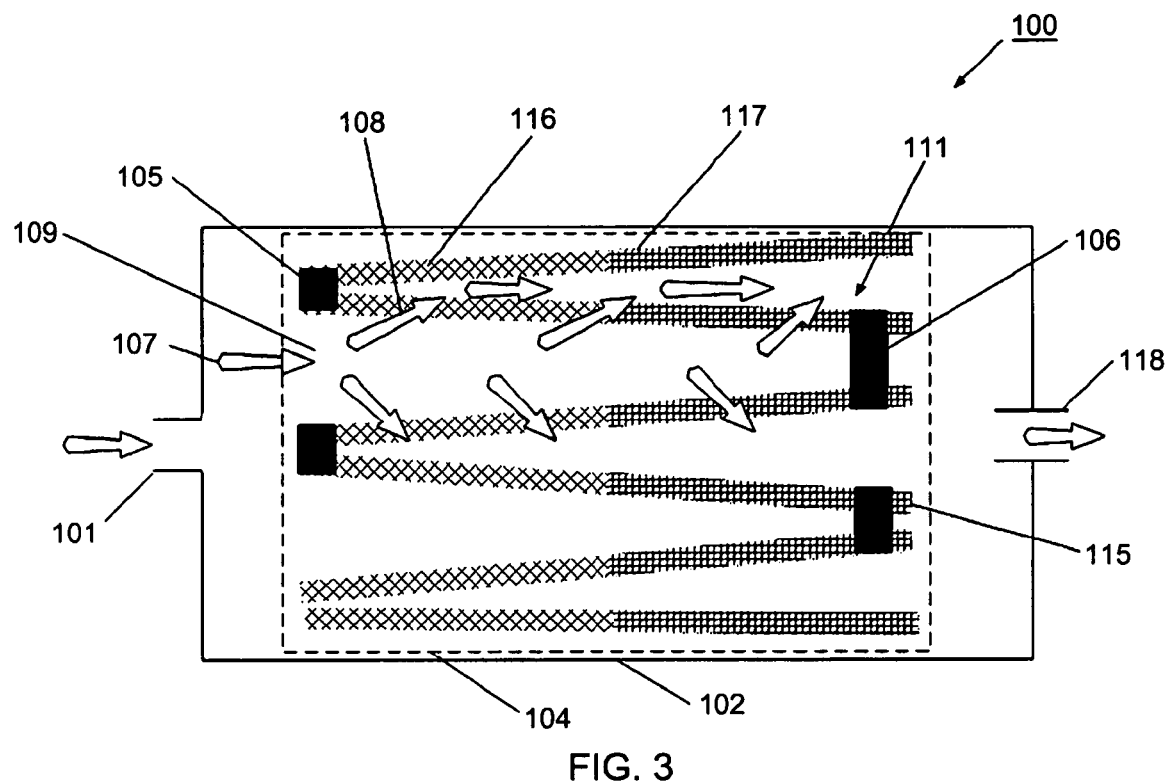
FIG. 3 is a diagram of a wall-flow particulate filter assembly in accordance with the present invention.

FIG. 3 illustrates another filter assembly 100 including a filter body 104 supported in housing 102 defining an inlet port 101 and an outlet port 118. Similar to the embodiment shown in FIG. 2, filter 104 operates entirely as wall flow filter, insofar as the gas flow 107 is first directed into inlet channels 109 by inlet and outlet blocks 105 and 106, flowed through 108 gas permeable walls 115 and into outlet channels 111. However, the walls are constructed with a porosity gradient so that different size particulates characterized by different particle sizes and/or shapes may be collected in different areas of the filter 104. For example, in certain applications, such as dirty or contaminated water filtration, such a porosity gradient would help to separate out the smaller filtered components, such as bacteria, from larger particulates, such as clay and/or sand, present in the dirty water. In one embodiment, the filter 104 may also be coated with a membrane or a zeolite/ZSM type or other filtering/catalytic material to create a sharp gradient in porosity and/or pore size. The porosity gradient may represent either continuous or discrete change, or a combination of both. In other words, a filter wall 115 may have a first portion 116 having a first porosity and a second portion 117 having a second porosity substantially different from the porosity of the first portion 116. Alternately, the wall 108 may be formed having a changing porosity that increases from one end to the other, with the increase in porosity being either smooth and continuous or discontinuous.

Figure 4:
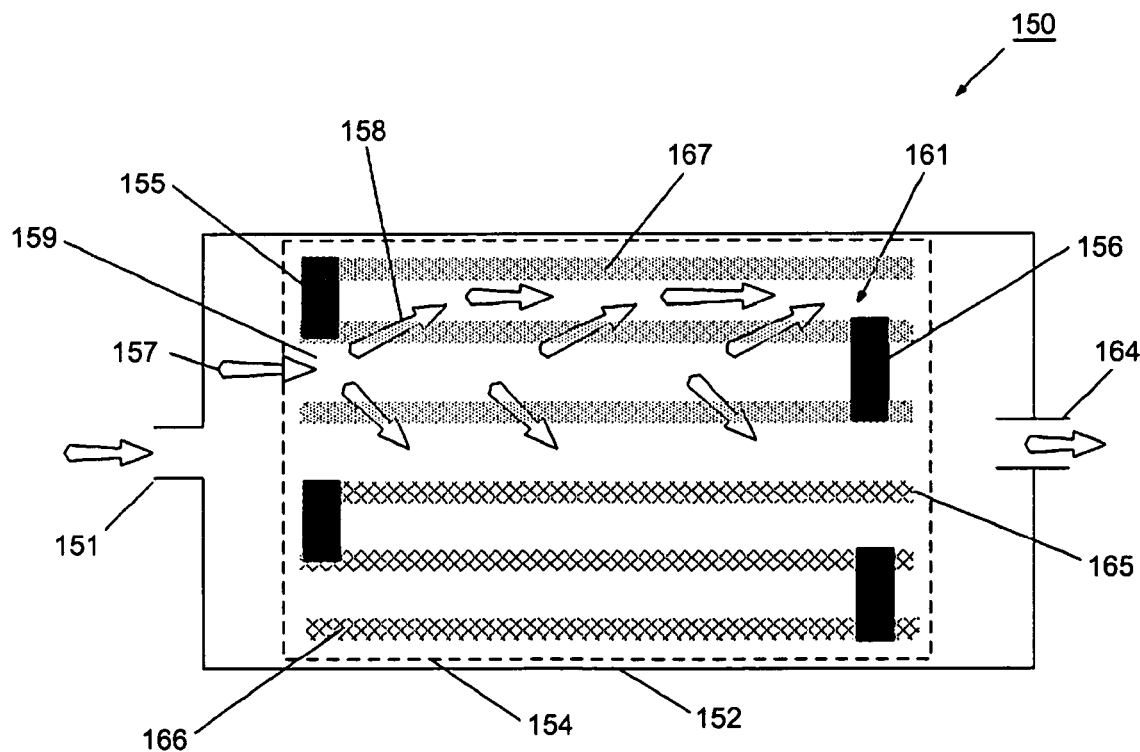
FIG. 4 is a diagram of a catalytic wall-flow particulate filter assembly in accordance with the present invention.

FIG. 4 illustrates still another wall flow filter assembly 150 generally relating to a filter body 154 supported by a housing 152 having a gas inlet port 151 and a gas outlet port 164, and this time including a reactive agent or catalyst material disposed on the channel walls 155. The filter assembly 150 still includes inlet and outlet channels 159, 161 with inlet and outlet blocks 155, 156 generally disposed as described above regarding FIGS. 2 and 3. The filter body 154 has two different catalyst areas. A first catalyst area 167 has a catalyst material disposed on at least some of the fibers making up the walls 165, wherein the catalyst material is selected to react with a first gas component or soot type, while a second catalyst area 166 has a second catalyst material disposed on at least some of the fibers making up the walls 165 and selected to react with a second, different gas component or soot type. It will be appreciated that different catalyst materials may be used in the conversion of various particulate and non-particulate pollutants into relatively harmless, benign non-pollutants.

Figure 5:
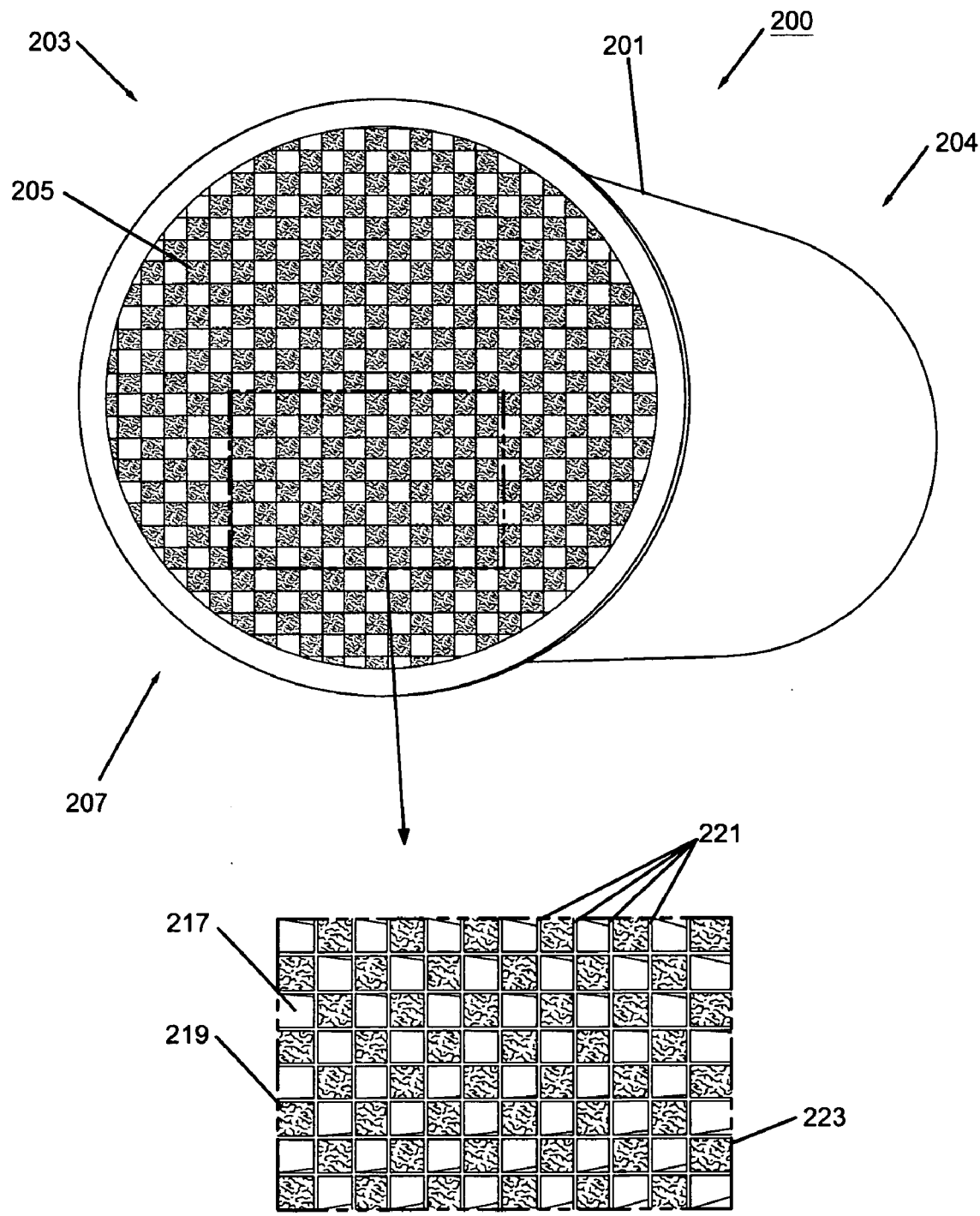
FIG. 5 is an end view of a wall-flow particulate filter assembly having a monolithic substrate in accordance with the present invention.

FIG. 5 shows particulate filter device 200. Particulate filter device 200 typically has the form of a housing 201 supporting a (typically monolithic) ceramic block 207 formed substantially of mullite fibers and defines a plurality of cells or channels 205. The particulate filter device 200 is also typically formed as a wall flow filter, more typically with one half the cells 205 having blocks 223 positioned substantially at one end 204 to define a set of inlet channels 217 and the other half of the cells 205 having blocks 223 positioned at the other, oppositely disposed end 203 to define a set of outlet channels 219. Typically, the inlet and outlet channels 217, 219 alternate with each other to define a checkerboard pattern 207 at either end of the device 200. In operation, gas flows into inlet channels 217 and is forced through gas permeable fibrous walls 221 into adjacent output channels 219. As gas is diffused through a fibrous wall 221, at least some particulate matter is strained out. Optionally, catalyst material may be present on the wall 221, such as on at least some of the fibers comprising the wall surface and/or the wall interior, such that pollutant material (gaseous species, particulate species, or both) is catalyzed upon passage therethrough.

FIGS. 6A-6C show another particulate filter system 250 structured as a flow-through particulate filter. The system 250 typically includes a housing 251 supporting a (typically monolithic) ceramic block 257 formed substantially of mullite fibers and defines a plurality of cells or channels 255. As a flow-through filter, a plurality of (typically parallel) wall portions 260 extend from the inlet side 253 through to the outlet side 254 to define a plurality of (typically parallel) channels 261, 263. In operation, much of the exhaust gas would flow through the filter interacting with only the surfaces of the wall portions 260, while a portion of the gas will flow through the wall portions 260 to be strained and cleaned as described above by its passage therethrough. Typically, some components of the particulate matter may also react with catalyst coated on the surface of the walls 260 of the flow channels 255 and convert to non-particulate species. In such a case, a partial reduction in particulate matter concentration is observed even during the flow-through process. However, due to the high porosity and high strength of the walls 260 and the generally narrow widths of the channels 255, substantial filtration effect may still be attributed to the wall flow activity. Such a filter, where wall-filtration is taking place in addition to flow through passage of fluid in an unobstructed manner, is also sometimes called a cross-flow filter. In one embodiment, there may be a different flow in the adjacent channels 255 to carry the filtered constituents away from the filter in a direction perpendicular to or different than the inlet flow direction. The presence of catalytic material, membranes or coatings may enhance the degree to which the inlet flow is attracted towards the walls 260 and is able to flow through the walls 260 to be filtered.

FIG. 6C illustrates and alternate the filter body 257' as formed from a plurality of filter body segments 265. The segments are sized and shaped to be assembled together to form a filter body 257' of a predetermined size and shape (as shown here, the segments have pie-piece shaped cross-sections and may be assembled to form a cylindrical filter body 257'. The segments 265 are typically held together by a mortar, cement or adhesive material 270. Typically, this mortar 270 has a composition the same as or similar to that of the as formed segments 265. More typically, the segments 265 are formed by extruding a substantially fibrous mullite slurry through a die with the channels 255 formed in situ and are then cut into the desired shapes to form the final body 257. The mortar is typically the same substantially fibrous mullite slurry, except typically made thicker to better function as a mortar 270. The so-assembled piece is then typically dried and cured. This mortar composition is advantageous as it yields a substantially porous mortar layer 270 that not only holds the segments 265 together but both has substantially the same physical properties as the segments (thus not contributing to thermal stresses arising from different CTE's) as well as allows fluid flow therethrough (thus not contributing significantly to increased back pressure effects). Alternately, the mortar 270 might have any convenient fibrous or non-fibrous composition, and may even be just water.

Figure 7A:
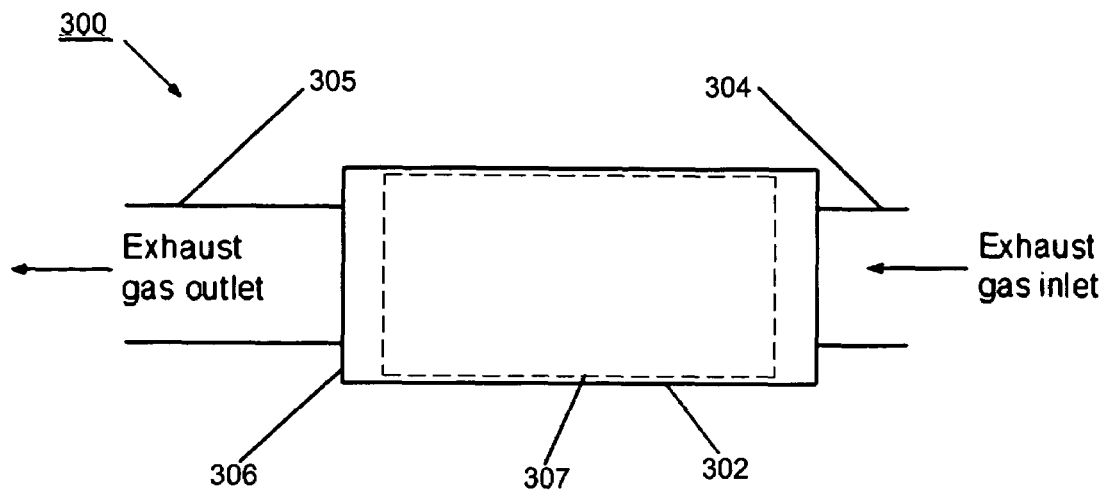
FIG. 7 is a diagram of an exhaust system using a particulate filter assembly in accordance with the present invention.
Figure 7B:
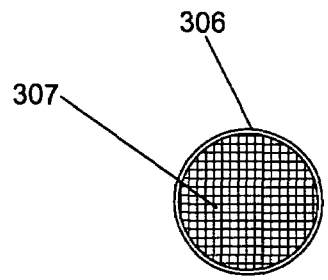

FIGS. 7A and 7B illustrate an exhaust system 300 incorporating a particle filter assembly 302 in accordance with the present invention. Exhaust gasses from an exhaust gas source enter the system 300 through an exhaust gas inlet 304 formed in assembly 302. Assembly 302 further includes a typically generally cylindrical or tubular outer shell or housing 306 that supports a channeled filter body 307 therein and directs the flow of fluids therethrough. The housing 306 is fluidically connected to a fluid inlet conduit 304 at one end and to a fluid outlet conduit at the opposite end 305. The housing 306 directs the flow of fluids such as exhaust gasses from the inlet 304 to the outlet 305 and, accordingly, through the filter body 307. The filter body 307 may be similar in construction to any of bodies 14, 54, 104, 154, 207, or 257 as described above and in the referenced figures. The walls of the cylindrical filter body 307 may have a gradient in porosity and/or pore size, and may also have a corrugated pattern to increase the surface area exposed to inlet flow. The cylindrical filter body 307 may be supported on either side by a wire-mesh structure.

Figure 8:
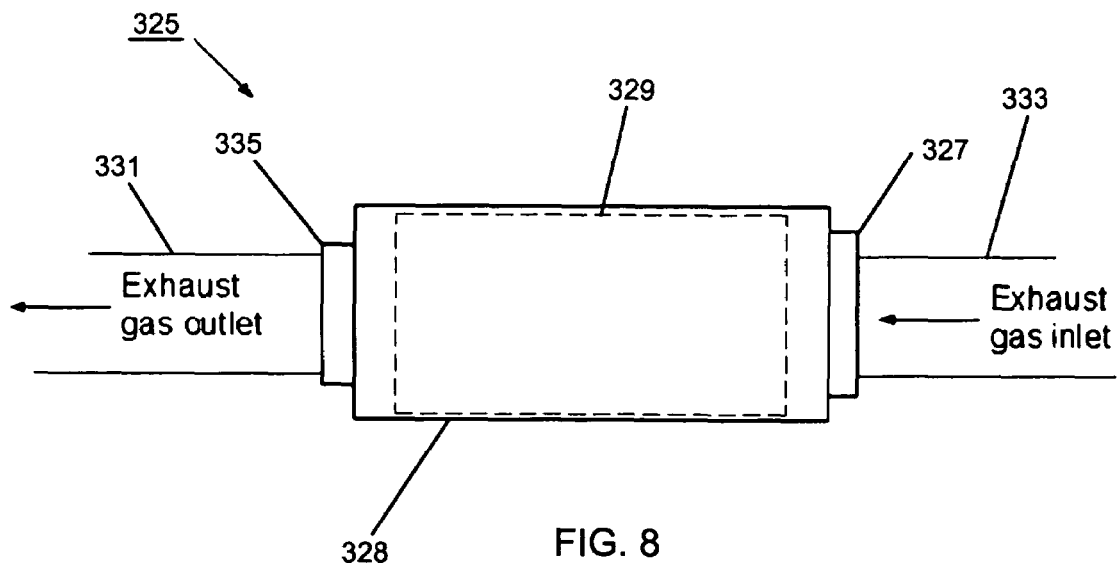
FIG. 8 is a diagram of a replacement particulate filter device in accordance with the present invention.

FIG. 8 shows a replacement filter 325 for use in aftermarket or assist applications. To facilitate easy connection and disconnection, the filter device 325 includes coupling connectors 335 and 327 affixed to either end of a generally cylindrical housing 328 to form a generally hollow support structure for holding a channeled filter body 329 and directing the flow of fluids therethrough. These couplers 327, 335 may engage respective fluid inlet and outlet conduits 333, 331 through such processes as welding, threading, or frictional connection. Again, the filter body 329 may be similar in construction to any of bodies 14, 54, 104, 154, 207, or 257 as described above and in the referenced figures.

Figure 9A:
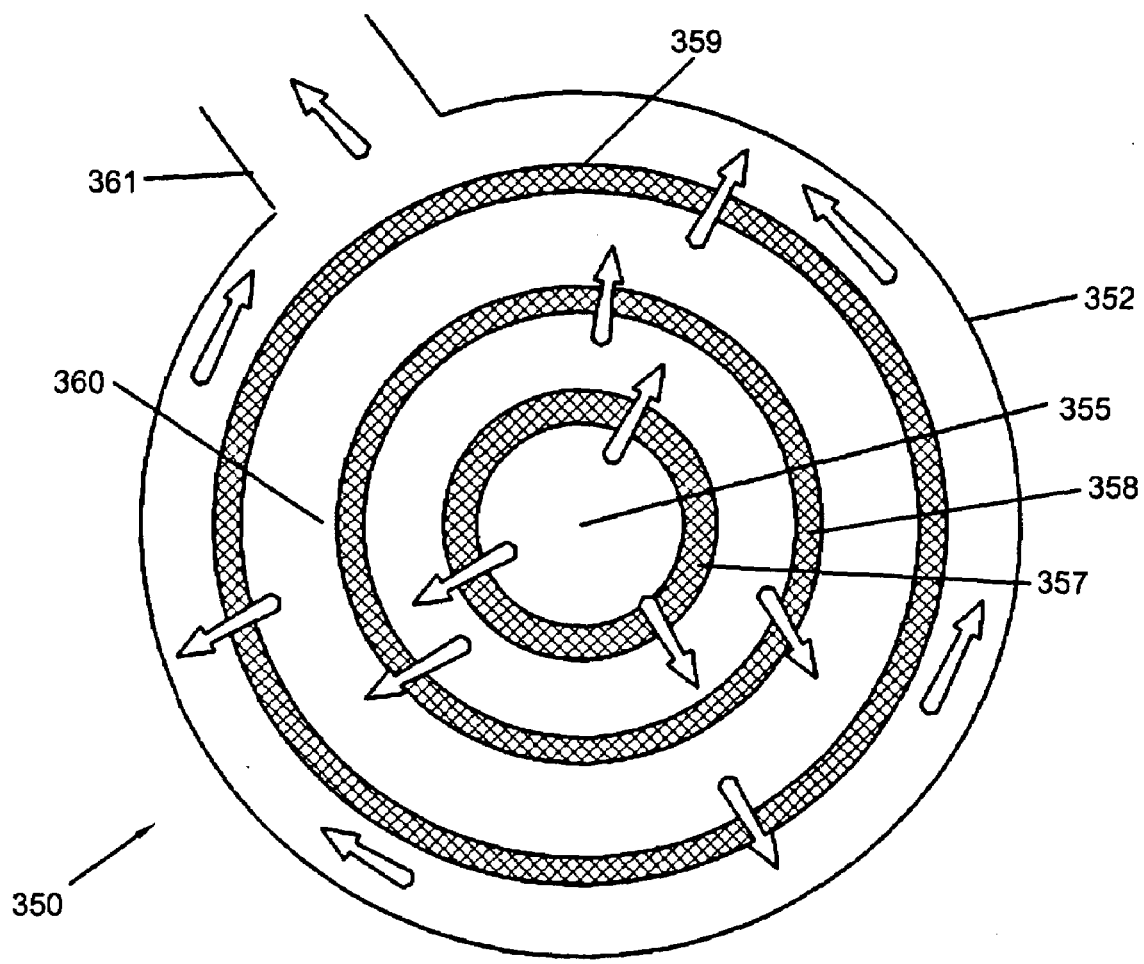
FIG. 9A is a diagram of a wall-flow particulate filter assembly in accordance with the present invention.
Figure 9B:
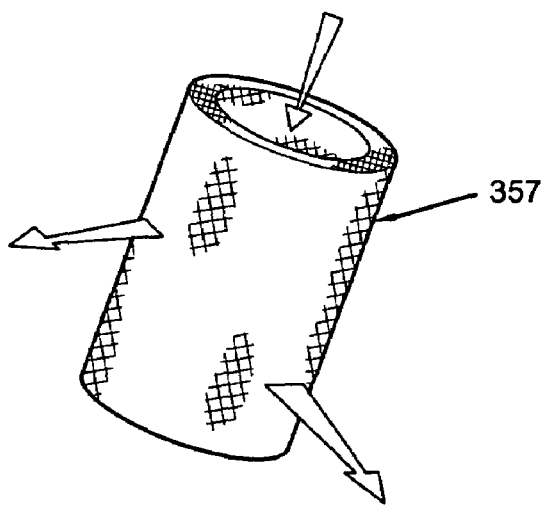
FIG. 9B is a perspective view of a cylindrical fibrous mullite wall-flow element of FIG. 9A.

FIGS. 9A-9B show another particulate filter system 350 operational via a wall flow mechanism. In filter system 350, an outer housing 352 includes an interior gas inlet channel 355 and one or more generally layered gas permeable substantially fibrous mullite walls 357, 358, 359. Each wall 357, 358, 359 has a generally hollow cylindrical configuration (see FIG. 9B) and operates similarly to a HEPA filter. Typically, the walls 357, 358, 358 are spaced to define gas flow channels 360 therebetween. In operation, exhaust gas enters the system 350 through inlet channel 355. The concentric cylinders or shells (in two dimensional sections, rings) of mullite fibrous walls 357, 358, 359 surround the inlet channel 355 and the gas pressure differential between the gas inlet 355 and the gas outlet 361 in pneumatic communication therewith provides an urging force on the exhaust gas through the gas permeable walls 357, 358, 359, thereby providing for wall flow filtration. Each shell or ring 357, 358, 359 may have a different porosity, thereby allowing finer gradients of particulate matter, such as soot, to be trapped in each successive shell or ring 357, 358, 359. Although filter 350 is shown with open space between each ring, it will be appreciated that the concentric rings may be stacked in an adjacent arrangement. After gas passes through all of the concentric shells/rings 357, 358, 359, the gas is collected and output through port 361.

Figure 10:
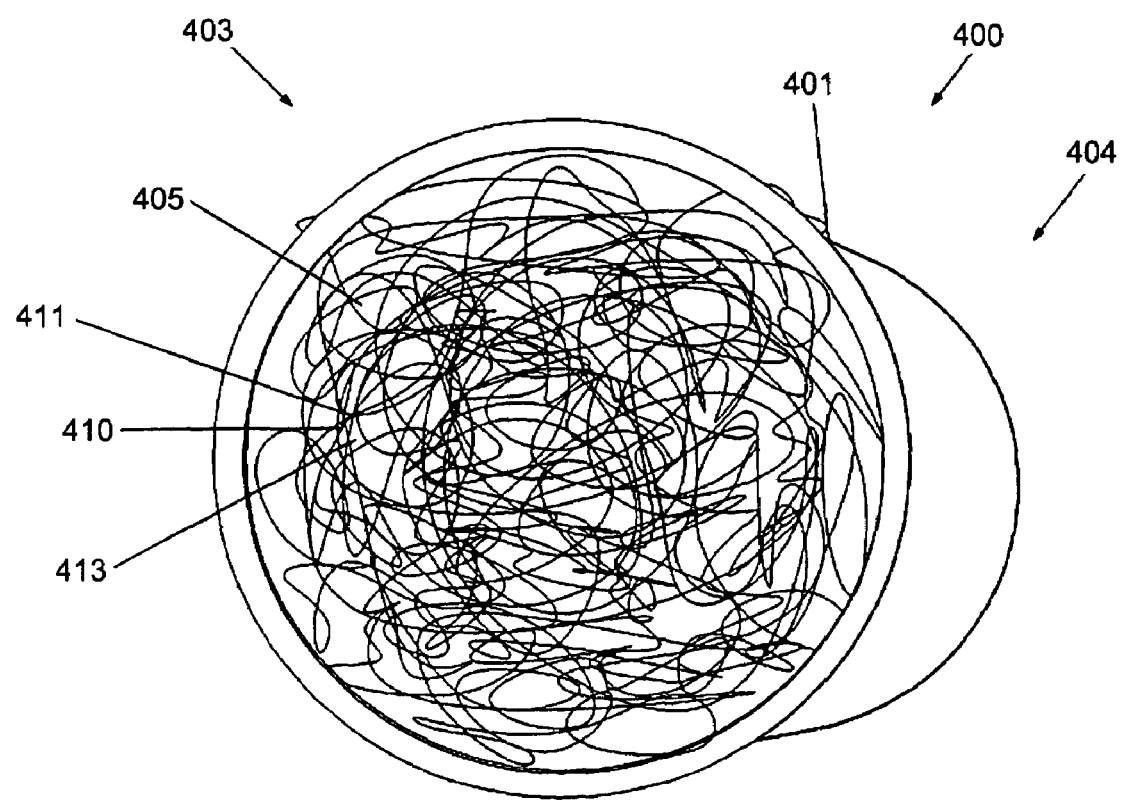
FIG. 10 is a perspective view of a wall-flow particulate filter assembly having a fibrous mullite wall-flow substrate in accordance with the present invention.

FIG. 10 shows another particulate filter 400. Particulate filter 400 includes a housing portion 401 having a gas inlet 403 and a gas outlet 404 and supporting a substantially fibrous mullite block 405 constructed into a highly gas permeable and/or porous filter. The mullite block 405 is typically formed as a single ceramic monolith, but may alternately be formed from sections and fit together in the housing 401. In one example, the porosity of the block is over 80%, and may even approach or exceed 90%. The mullite fibers 410 are substantially tangled and intersect to define nodes 411 that may also be bonds and also define void spaces or pores 413. In this way, random gas flow paths 413 are formed, allowing fibrous composite block 405 to trap soot while passing cleaned exhaust gas. The filter 400 is capable of filtering particulates of mean diameters much smaller than the smallest pore size in the filter 400.

Figure 11:
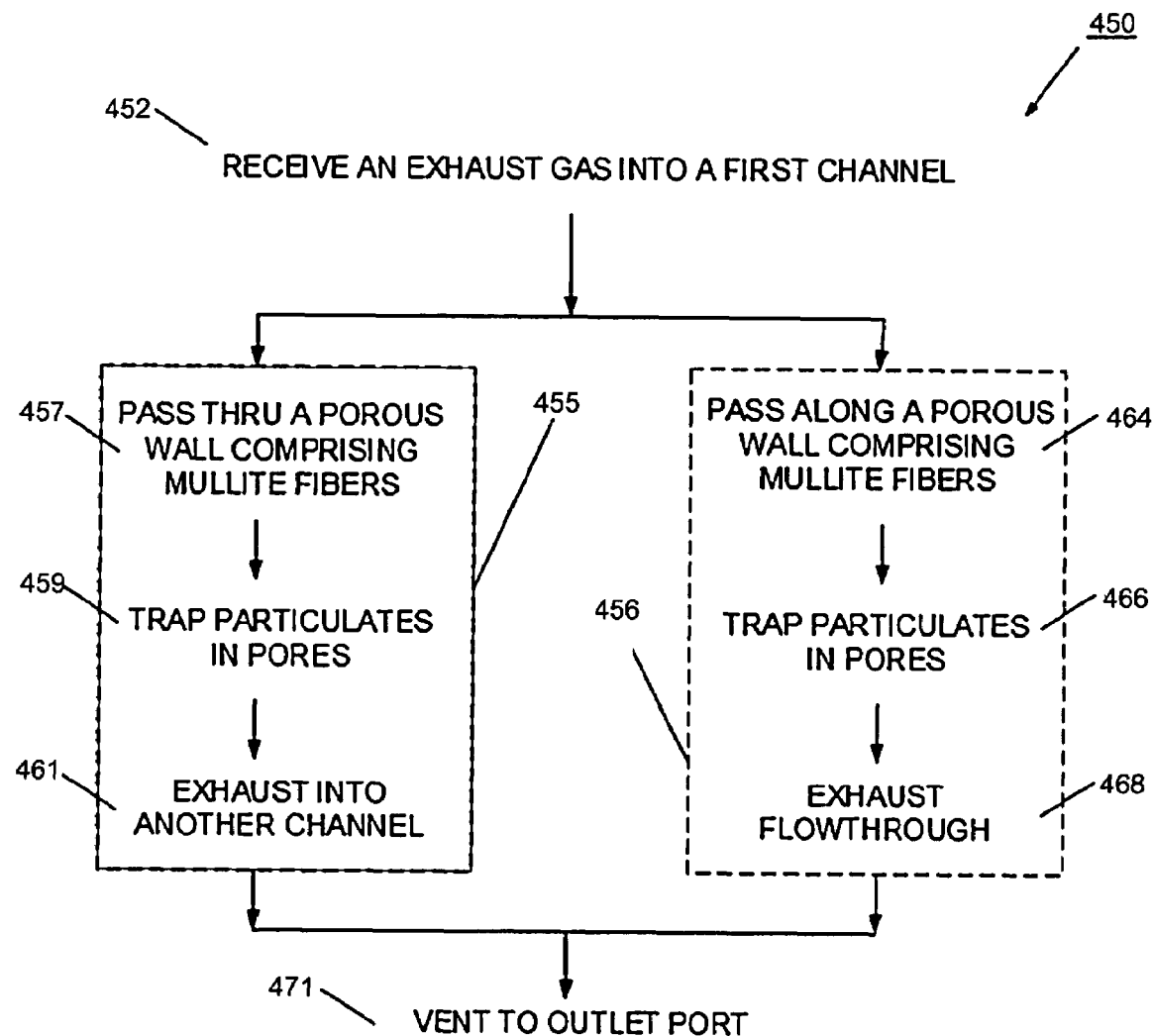
FIG. 11 is a flowchart of a method for particulate filtering in accordance with the present invention.

FIG. 11 shows a flowchart of a process for filtering an exhaust gas. Method 450 has an exhaust gas being received into a first channel as shown in block 452. Depending on whether the filter is a wall flow process 455 or a flow-through processed 456 the gas may take a different path. It will also be appreciated that some filters may be constructed to enable both types of filtering. If the filter has wall flow filtering 455 then the gas is passed through a porous wall which has mullite fibers as shown in block 457. The mullite fiber wall traps particulates in its pores as shown in block 459. The gas is then exhausted into another channel as shown in block 461 and vented out the outlet port as shown in 471. If the filter has a flow-through filtering, then the gas is passed along a porous wall comprising mullite fibers are shown in block 464. The soot particles are trapped in pores as shown in 466. Due to the high porosity and various pore sizes in the wall, the soot is still able to have a depth filtration effect, even in a flow-through process. The gas is exhausted through the same first channel, and then vented to the outlet port as shown in block 471.

FIG. 12 schematically illustrates another particulate filter system 500 including a housing portion 501 having a gas inlet 503 and a gas outlet 504 and supporting a first substantially fibrous mullite body portion 505 constructed into a highly gas permeable and/or porous filter. The mullite body 505 is typically formed as a single ceramic monolith, but may alternately be formed from sections and fit together in the housing 501. Typically, the porosity of the mullite body 505 is between about 60 and about 90 percent, more typically at least about 70 percent, and still more typically at least about 80 percent. The mullite fibers 510 are substantially tangled and intersect to define nodes 511 that may also be bonds and also define void spaces or pores 513. In this way, random gas flow paths 513 are formed, allowing fibrous composite block 505 to trap soot while passing cleaned exhaust gas.

The housing portion 501 further includes a second substantially fibrous mullite body portion 515 formed similarly to the first body portion 505, but additionally having a plurality of channels 523 formed therethrough. More typically, alternating channels 523 have plugs 526 positioned therein at alternating ends to substantially block gas flow therethrough, although the channels may be provided unplugged. Also, the mullite fibers 510 of the second body 515 are typically at least partially coated with a catalyst material 527, and more typically a washcoat layer 528 is deposited between a fiber 510 and its catalyst coating 527. Additionally, the fibers 510 of the first body 505 may likewise be at least partially coated with catalyst 527. Thus, the first body portion 505 is typically configured to function as a DPF element while the second body portion 515 is typically configured to function as a DOC element. Typically, the first body 505 is positioned downstream relative the second body 515 so as to take advantage of the hotter inlet gasses to heat the catalyst 527 most quickly and efficiently, but the second body 515 may likewise be positioned downstream relative the first body 505. Even more typically, the second body 515 is positioned substantially adjacent the inlet 503 and the filter 500 is positioned quite near or substantially adjacent the exhaust gas source to maximize the heating time and efficiency of the catalyst material 527; this configuration is typically called close-coupling the catalyst. The catalyst 527 is typically chosen to oxidize gaseous species such as CO and/or hydrocarbons and/or to reduce NO. Both bodies 505, 515 may trap soot and particulate matter, which may be oxidized periodically via regeneration or, more typically, in the presence of a catalyst composition selected to likewise promote oxidation of the soot and/or particulate matter so entrapped. The soot-burning catalyst 527 may be present on the fibers 510, injected periodically into the system 500, or a combination of both. The filter 500 is thus capable of filtering particulates of mean diameters much smaller than the smallest pore size in the filter 500 as well as catalytically converting undesirable species into more desirable species.

FIG. 13 schematically illustrates another particulate filter system 550 similar to that shown in FIG. 12. Filter 550 includes a housing portion 551 having a gas inlet 553 and a gas outlet 554 and supporting a first substantially fibrous mullite body portion 555 constructed into a highly gas permeable and/or porous filter. The mullite body 555 is typically formed as a single ceramic monolith, but may alternately be formed from sections and fit together in the housing 551. Typically, the porosity of the block is between about 60 and about 90 percent, more typically at least about 70 percent, and still more typically at least about 80 percent. The mullite fibers 560 are substantially tangled and intersect to define nodes 561 that define void spaces or pores 563 to form random gas flow paths. The fibrous structure of the body 555 thus allows it to trap soot while passing cleaned exhaust gas.

The housing portion 551 further includes a second substantially fibrous mullite body portion 565 formed similarly to the first body portion 555, but additionally having a plurality of channels 553 formed therethrough. More typically, but not necessarily, the alternating channels 573 have plugs 576 positioned therein at alternating ends to substantially block gas flow therethrough. Also, the mullite fibers 560 of the second body 565 are typically at least partially coated with a catalyst material 577, and more typically a washcoat layer is deposited between a fiber 560 and its catalyst coating 577. Additionally, the fibers 560 of the first body 555 may likewise be at least partially coated with the same or a different catalyst 577. Typically, the first body 555 is positioned downstream relative the second body 565 so as to take advantage of the hotter inlet gasses to heat the catalyst 577 most quickly and efficiently, but the second body 565 may likewise be positioned downstream relative the first body 555. Even more typically, the second body 565 is such that the filter 550 is close-coupled. Thus, the first body portion 555 is typically configured to function as a DPF element while the second body portion 565 is typically configured to function as a DOC element.

A third substantially fibrous mullite body portion 580 is likewise positioned in the housing 551 downstream of the first two body portions 555, 565. The third body portion 580 may be substantially similar in construction and function to the second body portion 565, and thus function as a 'clean-up' diesel oxide converter (DOC), further converting residual species that were unconverted during passage through the second body 565. The third body 580 may thus have the same catalyst composition 527 as the second body 565 at least partially coating its fibers 561, a different catalyst composition 527 (directed at catalyzing the same or different species), or a combination of the two.

Alternately, as illustrated in FIG. 14, a third body portion 590 may be provided as a selective catalytic reduction (SCR) module, a lean NOx trap, and SCR and/or NOx trap followed by a clean-up DOC, or the like to define a filter 600. The filter 600 is thus identical in form and operation to the filter 550 described in FIG. 13, with the exception that the third body is not necessarily a fibrous mullite body, but instead may be partially or completely a known exhaust gas treatment element. Likewise, the first and second body portions 605, 615 may be a mullite DPF element and a mullite DOC element, respectively, as described above (i.e., the mullite fibers 610 have intersections 611 defining open pore pathways 613 and the second body 615 includes channels 623 that may be plugged 626), or, alternately, one body 605, 615 may be a fibrous mullite DPNR element (i.e., the fibers 610 are at least partially coated with a catalyst 627 material that catalyzes the reduction of NOx species) such that it both filters particulate matter and eliminates NOx.

The above-described systems 200, 250, 300, 350, 400, 450, 500, 550, 600 may also typically include various gas sensors, injection controllers, fuel-reformers, heating devices, pressure control valves, and/or modules (not shown) for integration into the ECU.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of removing particulate matter from an exhaust gas, comprising:
   receiving an exhaust gas into a first channel of a honeycomb porous filter;
   passing at least some of the exhaust gas through a wall to a second channel of the honeycomb porous filter;
   trapping the particulate matter in the porous filter, the porous filter having pores at least partially defined by intertangled mullite fibers, the intertangled mullite fibers bonded into a nonwoven rigid porous matrix; and
   exhausting the cleaned exhaust gas from the second channel.

2. The method according to claim 1, further including the step of regenerating the walls at a temperature in the range of about 200 degrees Celsius to about 500 degrees Celsius.

3. The method according to claim 1, further including the step of regenerating the walls at a temperature in the range of 150 degrees Celsius to about 750 degrees Celsius.

4. The method according to claim 1 wherein the wall is a cylinder substantially made up of intertangled mullite fibers.

5. The method according to claim 1 wherein the wall is housed within a housing member and separates the first channel from the second channel.

* * * * *